United States Patent
Cornfield

(10) Patent No.: US 7,669,525 B2
(45) Date of Patent: Mar. 2, 2010

(54) MULTI-PURPOSE CULINARY IMPLEMENT

(76) Inventor: Randall Cornfield, 5499 Robert Burn Avenue, Suite 208, Montreal, Quebec (CA) H4W 2B4

(*) Notice: Subject to any disclaimer, the term of this patent is extended or adjusted under 35 U.S.C. 154(b) by 971 days.

(21) Appl. No.: 11/119,282

(22) Filed: May 2, 2005

(65) Prior Publication Data

US 2005/0252387 A1 Nov. 17, 2005

Related U.S. Application Data

(60) Provisional application No. 60/568,686, filed on May 7, 2004.

(51) Int. Cl.
 *A23J 1/09* (2006.01)
 *A23G 1/10* (2006.01)
(52) U.S. Cl. .......................................... 99/500; 99/485
(58) Field of Classification Search .................. 99/500, 99/485, 486, 487, 488, 489, 490, 491, 492, 99/493, 495, 496, 497, 498, 499
See application file for complete search history.

(56) References Cited

U.S. PATENT DOCUMENTS

2002/0078834 A1* 6/2002 Thackray ..................... 99/492
2004/0200366 A1* 10/2004 Koerselman et al. .......... 99/537

* cited by examiner

*Primary Examiner*—Daniel L Robinson
(74) *Attorney, Agent, or Firm*—Dan M. De La Rosa

(57) ABSTRACT

A food preparation apparatus is provided, the apparatus comprises: a main frame having a central opening for receiving a food preparation implement and having opposing ends; and at least one interchangeable food preparation implement designed to be inserted within the central opening and locked onto the main frame during usage and being removable for cleaning and storage during non-use, the food preparation implement is selected from a group consisting of mandolins, graters, cutting devices, potato fry cutters, slicers, corers, peelers, pressing devices, food mashers, food presses and mixtures thereof.

18 Claims, 37 Drawing Sheets

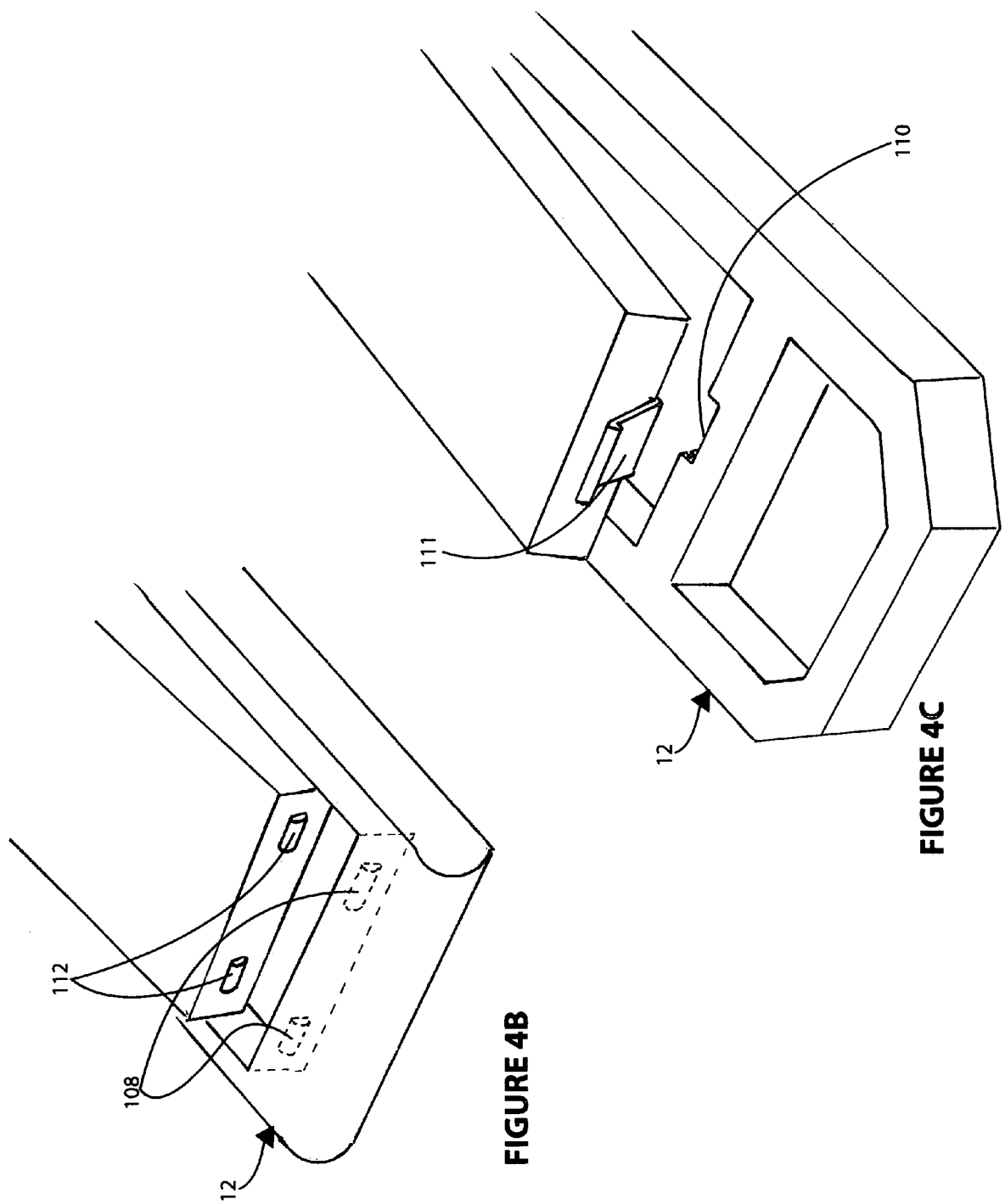

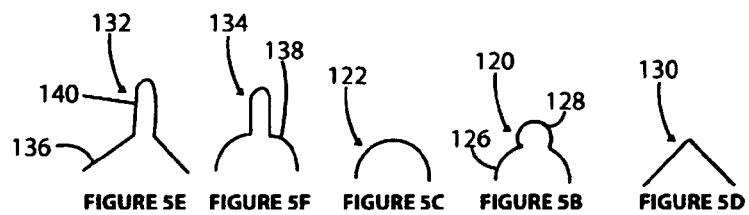
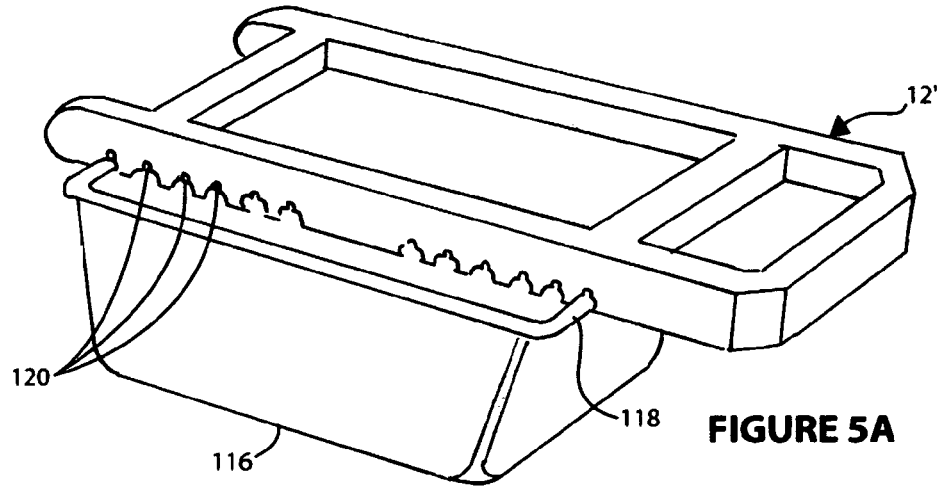
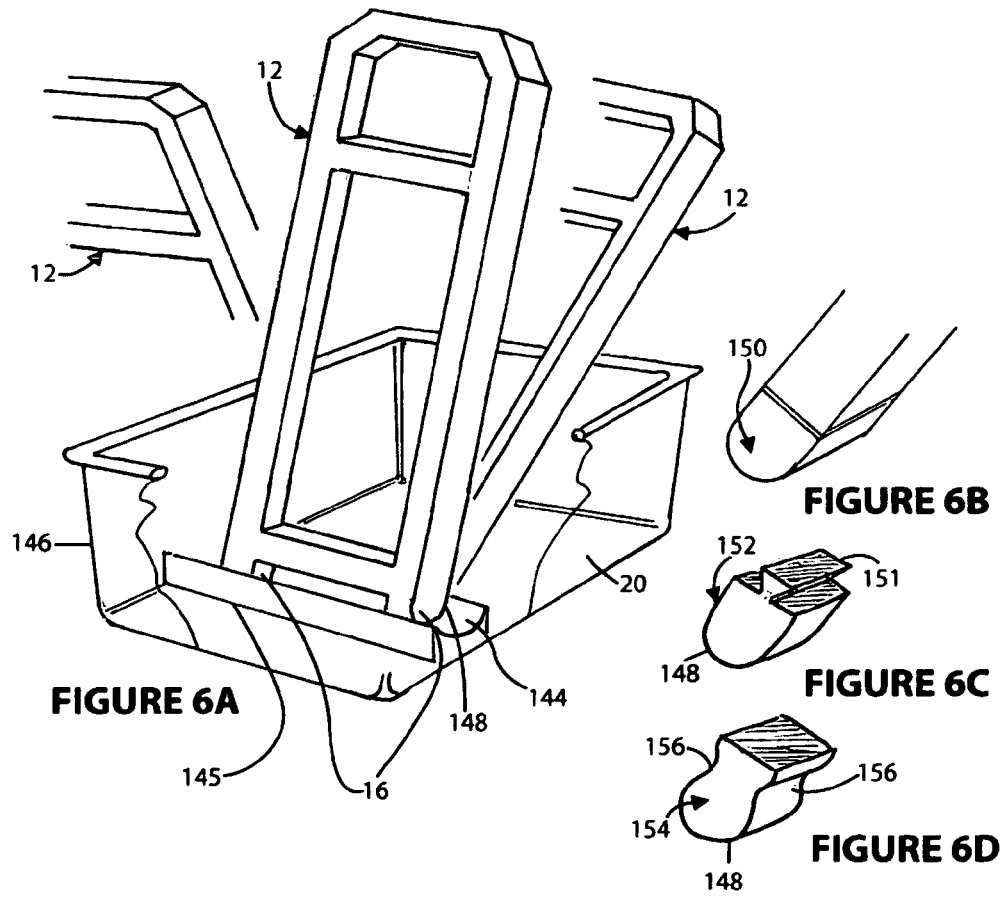

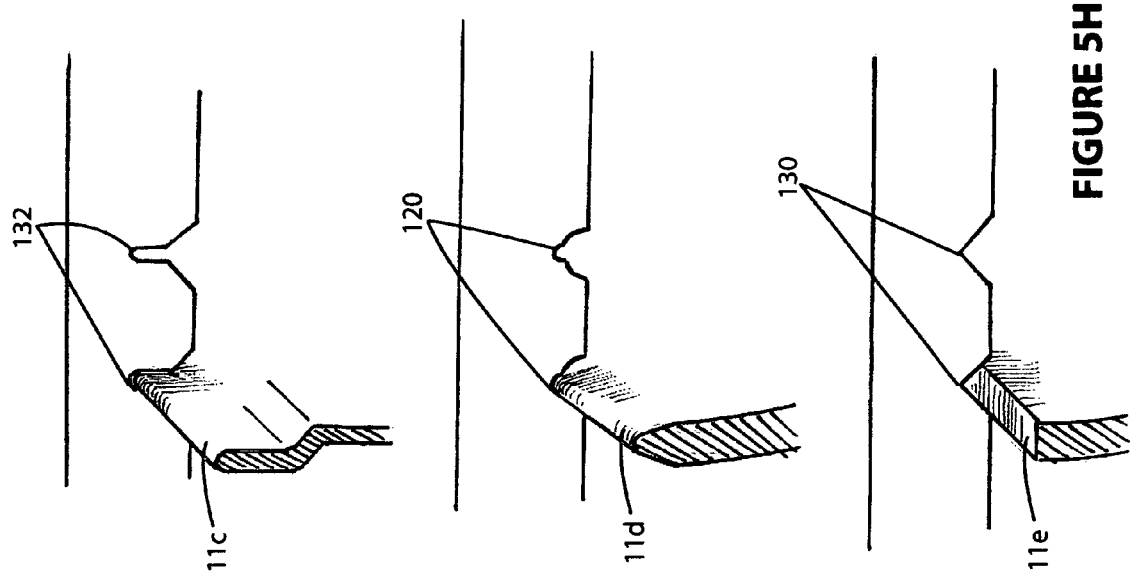
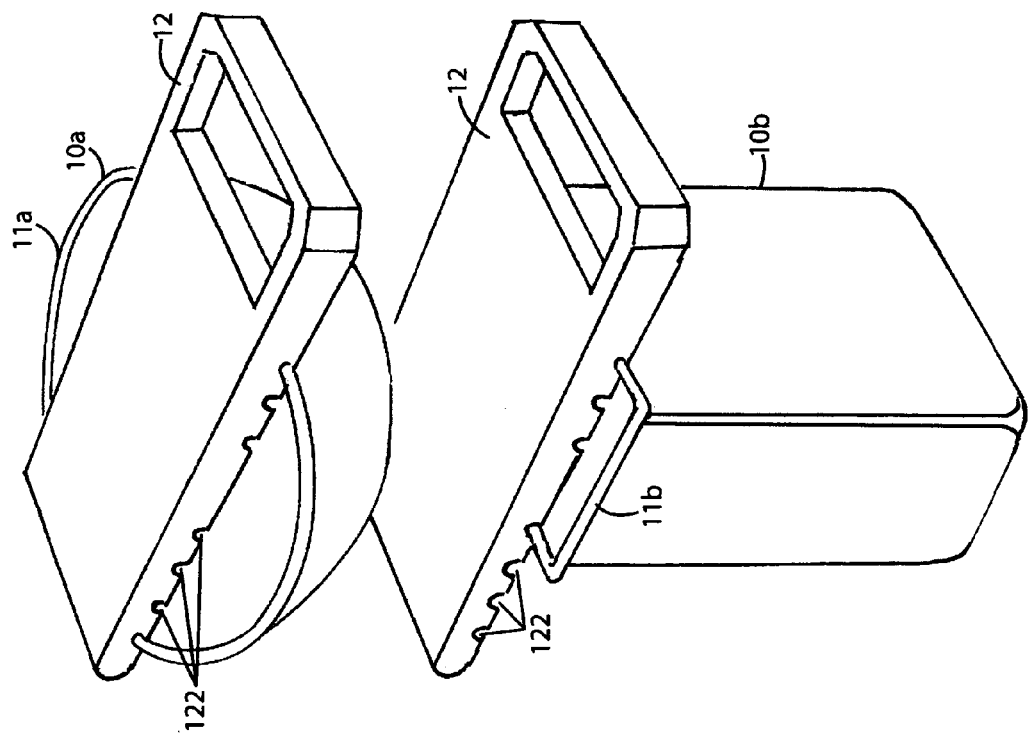
FIGURE 5H
FIGURE 5G

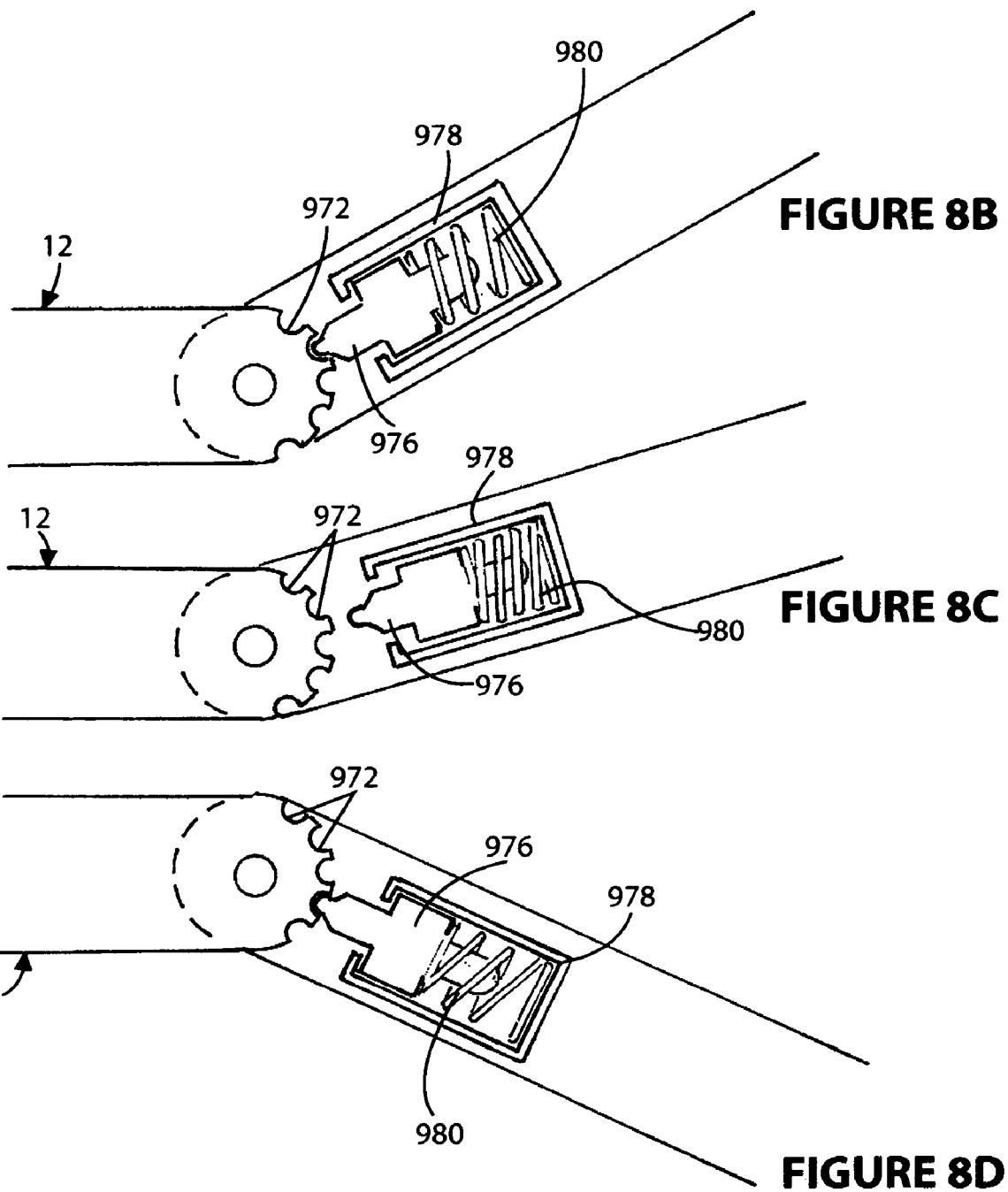

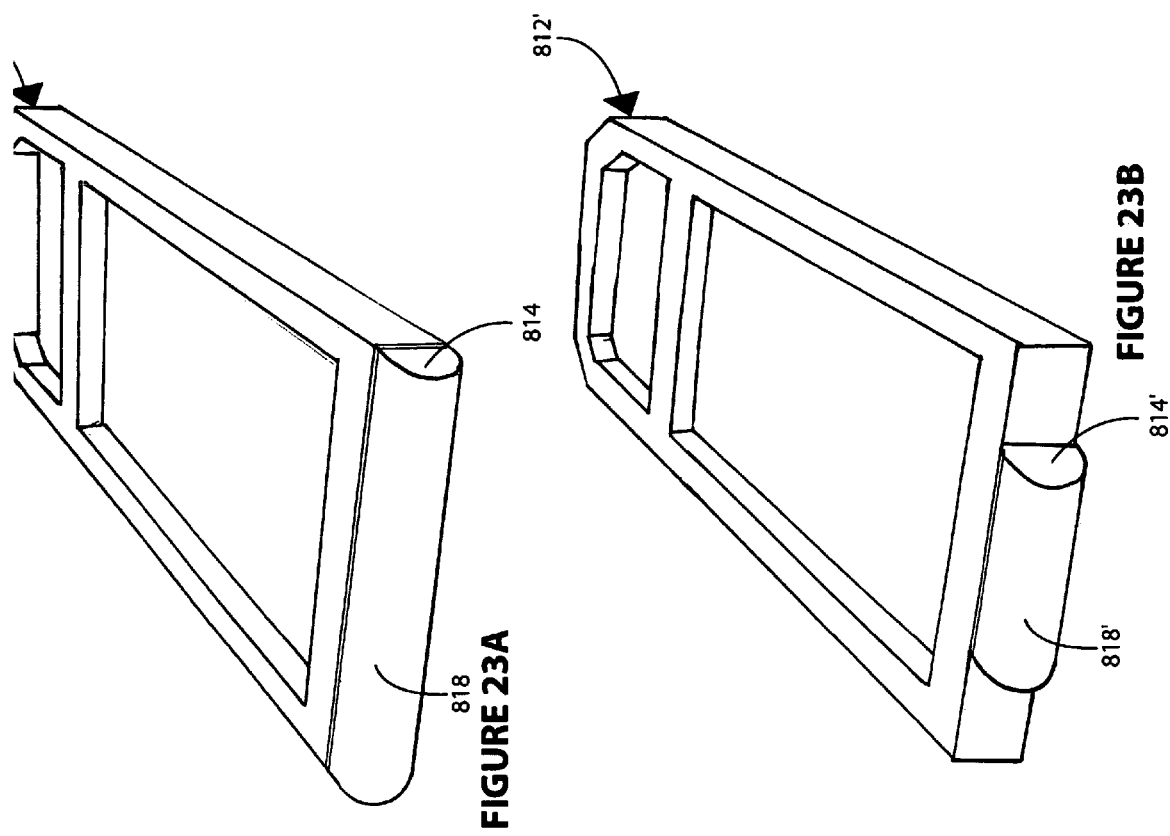

MULTI-PURPOSE CULINARY IMPLEMENT

RELATED APPLICATION

This application is related to provisional application of U.S. Application Ser. No. 60/568,686, entitled "Multi-Purpose Culinary Implement" which was filed on May 7, 2004.

BACKGROUND OF THE INVENTION

1. Field of the Invention

The present invention relates to the general field of culinary implements. More specifically, the present invention is concerned with a multi-purpose culinary implement and its related apparatus and systems.

2. Description of the Related Art

There exist many culinary implements for grating or cutting food. Typically, each implement is directed to a single use. For example, a grater can only be used for grating food, and not for cutting or other purposes.

Accordingly, a user typically needs to buy many devices to perform the many tasks required for preparing various dishes. Therefore, the cost of having a well-equipped kitchen is rather high. Also, storage of these many culinary implements requires a relatively large amount of space.

There exist a few culinary implements, known as mandolins that can serve many purposes. For example, one such implement includes a primary blade for cutting a slice of food and can accept a secondary blade for cutting the food in a direction perpendicular to the direction into which the food is cut by the primary blade. Accordingly, such a mandolin can cut sticks of food.

However, currently available mandolins have many drawbacks. For example, such mandolins include a handle for holding the mandolin while cutting is performed. Typically, the handle is fixed with respect to the mandolin and therefore does not provide an optimal ergonomic means for holding the mandolin.

Also, such mandolins are either provided with custom receptacle on top of which they can be attached or are provided with generic notches that can engage the rims of a receptacle already owned by the user. In both cases, it is impossible for a user to use the mandolin with a wide range of receptacles as the notches provided within the mandolin typically can only engage with stability rims having a very narrow range of width.

Some mandolins have replaceable primary and secondary blades. If a user wishes to modify a thickness of slices of food products while cutting with the mandolin, an insert has to be changed. Typically, such inserts are rather large and can therefore only provide a limited number of thicknesses, thereby limiting the different thicknesses into which the food can be cut.

Generally, culinary implements such as slicers or graters need to be located within a container or on a working surface, such as a cutting board, so that the food processed by the implement falls into the container or on the working surface. However, a user typically exerts considerable force upon the implement when processing food. Therefore, the implement has a strong tendency to move within the container or on the working surface.

To counter such movements, the user often presses on the implement such that the friction between the container or the working surface and the implement is relatively large. Alternatively, the user holds the implement tightly to reduce movements of the implement with respect to the container or the working surface. In both cases, a force is exerted with great effort from the user and can lead to unexpected and sudden slippage of the implement within the receptacle or on the working surface if a contact force between the food and the implement varies suddenly. Such slippage often results in an abrupt movement of the implement causing food, the working surface or the receptacle to fall on the floor.

There also exist devices for cutting potatoes, eggs, and garlic and for cracking nuts. However, typically, each of these devices serves only one purpose. Therefore, once again, a user needs to buy a plurality of devices to perform all the tasks.

Also, many implements for cutting potatoes or eggs are simply blades mounted on a piston, which can be received in a sleeve, the piston being activated by a user pushing thereon. Therefore, the force required to cut food with such devices is relatively great. Accordingly, there exists a need in the industry for an improved multi-purpose culinary implement.

The present description refers to a number of documents, the content of which is herein incorporated by reference in their entirety.

SUMMARY OF THE INVENTION

In one embodiment of the invention, the present invention relates to a food preparation apparatus comprises: a main frame having a central opening for receiving a food preparation implement and having opposing ends; and at least one interchangeable food preparation implement designed to be inserted within the central opening and locked onto the main frame during usage and being removable for cleaning and storage during non-use, the food preparation implement is selected from a group consisting of mandolins, graters, cutting devices, potato fry cutters, slicers, corers, peelers, pressing devices, food mashers, food presses and mixtures thereof.

In another embodiment, the apparatus further comprises a moveable handle attached to one end of the main frame, the handle being adjustable and moveable relative to the main frame to create angles greater than 1 degree and less than 360 degrees and a locking device for setting the handle at a fixed position.

In still another embodiment, the main frame has a top side and bottom side, the bottom side of the main frame comprises at least two grooves, each groove comprising a double notch profile for engaging a container with a lip and attaching the main frame onto the container when the apparatus is being used with the container.

In yet another embodiment, the apparatus further comprises at least one container designed to work with the main frame during use, the container comprising an opening and a cavity formed by a base and side walls, the base having at least one protrusion for supporting the apparatus during use, the side walls having at least one ledge for supporting the apparatus during use.

In still yet another embodiment, the food preparation implement comprises at least one nipple and the main frame comprises a receiving cavity and at least one locking device, the nipple engaging the cavity and the locking device engages the implement to thereby allowing the implement to lock onto the main frame during use.

In a further embodiment, the apparatus further comprises at least one slider, the slider comprising at least one pusher and a pusher base, the pusher base comprises a base and side walls forming an internal cavity, the internal cavity designed to receive the pusher, the internal cavity designed to receive the food articles for cutting, slicing and grating.

In still a further embodiment, the pusher comprises a plunger body with a top side and bottom side, the top side having a pushing surface for supporting a user's hand, the bottom side of the plunger body having a plurality of protrusion for engaging the food article, the base of the pusher base comprising a top side and a bottom side, the side walls and the internal cavity is situated on the top side of the pusher base.

In yet a further embodiment, the pusher base further comprises at least one insertable and removeable sidewall for adjusting the size of the internal cavity of the pusher base. In still yet a further embodiment, the slider further comprises at least one vertical sliding arm and at least one attachment, the sliding arm being connected to the pusher base and the sliding arm being designed to engage the attachment during use with the main frame.

In another further embodiment, the attachment comprises a runner system, the system comprising at least one wheel, the runner system being designed to engage and work with the main frame of the apparatus. For purposes of this invention, the term slider shall also encompass the term hand guide.

In still another further embodiment, the handle of said apparatus is useable with one hand and adjustable relative to the main frame with one finger. In yet another further embodiment, the main frame comprises at least two arms for receiving the handle. In still yet another further embodiment, the handle is adjustable and removable from the arms of the main frame.

In another embodiment, the present invention relates to a food preparation system comprising: a main frame having a central opening for receiving a food preparation implement and having opposing ends; at least one interchangeable food preparation implement designed to be inserted within the central opening and locked onto the main frame during usage and being removable for cleaning during non-use, the food preparation implement is selected from a group consisting of mandolins, graters, cutting devices, potato fry cutters, slicers, corers, peelers, pressing devices, food mashers, food presses and mixtures thereof; a moveable handle attached to one end of the main frame, the handle being adjustable and moveable relative to the main frame to create angles greater than 1 degree and less than 360 degrees; at least one container designed to work with the main frame during use; and at least one slider.

In still another embodiment, the main frame has a top side and bottom side, the bottom side of the main frame comprises at least two grooves, each groove comprising a double notch profile for engaging a container with a lip and attaching the main frame onto the container when the apparatus is being used with the container.

In yet another embodiment, the container comprises an opening and a cavity formed by a base and side walls, the base having at least one protrusion for supporting the apparatus during use, the side walls having at least one ledge for supporting the apparatus during use.

In still yet another embodiment, the wherein the food preparation implement comprises at least one nipple and the main frame comprises a receiving cavity and at least one locking device, the nipple engaging said cavity and the locking device engages the implement to thereby allowing the implement to lock onto the main frame during use.

In a further embodiment, the system said further comprises at least one slider, said slider comprising at least one pusher: a pusher base: at least one vertical sliding arm: and at least one attachment, the pusher base comprises a base and side walls forming an internal cavity, the internal cavity designed to receive the pusher, the internal cavity designed to receive the food articles for cutting, slicing and grating.

In a further embodiment, the pusher comprises a plunger body with a top side and bottom side, the top side having a pushing surface for supporting a user's hand, the bottom side of the plunger body having a plurality of protrusion for engaging the food article, the base of the pusher base comprising a top side and a bottom side, the side walls and the internal cavity is situated on the top side of the pusher base.

In another embodiment, the sliding arm is connected to the pusher base and the sliding arm being designed to engage the attachment during use with the main frame.

In a first broad aspect, the invention provides a receptacle for supporting a culinary implement having a handling portion allowing a user to handle the culinary implement, and a foot portion for supporting the culinary implement within the receptacle. The receptacle includes a base wall and a peripheral wall connected to the base wall. At least one of the peripheral and base walls includes a receiving portion configured and sized to receive the foot portion such that the culinary implement can be held by a user through the handle, and by the receptacle through the foot portion, so as to immobilize the culinary implement with respect to the receptacle.

Advantageously, the receptacle allows a user to hold the culinary implement by the handle with one hand while the foot portion is held within the receptacle. Therefore, this allows the user to have a free hand for using the culinary implement. In addition, the receiving portion helps stabilize the culinary implement within the receptacle.

In a variant, the receptacle includes a plurality of anti-slip features provided on the bottom portion of the receptacle.

In another variant, the receptacle includes a receiving portion wherein the foot portion of the culinary implement is easily pivotable. Therefore, this receiving portion allows the user to hold the culinary implement over a wide range of angles. In this variant, a profile of the foot portion of the culinary implement matches a profile of the receiving portion.

In another broad aspect, the invention provides a culinary implement supportable by a receptacle defining a rim having a width. The culinary implement includes a frame, a food processing portion for processing a piece of food, the food processing portion being connected to the frame, and a plurality of notches provided within the main frame. The notches are for supporting the frame onto the receptacle.

Each notch includes a first portion defining an opening for receiving the rim and a second portion extending from the first portion, the second portion being for receiving the rim if the width of the rim is smaller than a predetermined width. Only the first portion receives the rim if the width of the rim is larger than the predetermined width.

Examples of food processing portions include a mandolin insert, a grater insert, a piston actuated food processing device insert and a peeler insert, among others.

The plurality of implements allows a user to have a single unit serving many purposes. Consequently, the cost of acquiring the required implements, along with the space required for storage, is reduced.

In a variant, the piston-actuated food processing device insert includes a handle connected to a lever and a piston slidable within a sleeve through the action of the lever. Accordingly, the amount of force required to operate the piston-actuated food processing device is relatively low. In addition, in yet another variant, a plurality of inserts are provided such that the piston actuated food processing device can serve many purposes such as, for example, cutting eggs, cutting potatoes, pressing garlic and cracking nuts.

In one variant, the piston includes a bottom opening and a top opening while the sleeve includes a top opening. Therefore, when the piston has cut through food contained within the sleeve, a user can pick up the cut food easily. Alternatively, if the user retracts the piston from the sleeve, the blade will move the food outside of the sleeve, and will therefore allow the food to fall through the bottom opening into a container previously located below the piston actuated food processing device insert. Therefore, the user has a choice to either pick up the food with his hands prior to retracting the piston from the sleeve, or have the food fall into a container when retracting the piston from the sleeve.

In yet another broad aspect, the invention provides a culinary implement supportable by a receptacle defining a rim having a cross-section profile. The culinary implement includes a frame, a food processing portion for processing a piece of food, the food processing portion being connected to the frame, and a plurality of notches provided within the main fame. The notches are for supporting the frame onto the receptacle.

In a variant, each notch is shaped similarly to the cross-section profile. In another variant, each notch is shaped to engage partially or totally the rim. In this last variant, some embodiments of the invention include notches capable of engaging rims having different cross-section profiles.

In yet another broad aspect, the invention provides a culinary implement, including a frame, a food processing portion for processing a piece of food, the processing portion being connected to the frame, and a handle connected to the frame. The handle can be positioned at a plurality of handle orientations with respect to the frame.

Advantageously, the handle allows an ergonomic use of the culinary implement in relation to the main frame. In yet another broad aspect, the invention provides a cutting culinary implement including a frame and a base pivotably attached to the frame. The base has an edge. The culinary implement further includes a blade insert removably attached to the frame, the blade insert including a blade overlapping the edge. Pivoting the base within the frame allows the user to vary distance between the blade and the edge. Therefore, the thickness of slices to be cut by the culinary implement can easily be varied. In addition, the possible number of different thicknesses is increased with respect to some prior art devices.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

FIG. 4B illustrates in part the attachment of an accessory to the frame of FIG. 4A;

FIG. 4C illustrates in part the attachment of an accessory to the frame of FIG. 4A;

FIG. 5A illustrates an alternative frame positioned on a receptacle, the frame includes a plurality of notches;

FIG. 5B illustrates the general shape of the notches of FIG. 5A;

FIG. 5C illustrates an alternative shape for the notches of the frame of FIG. 5A;

FIG. 5D illustrates another alternative shape for the notches of the frame of FIG. 5A;

FIG. 5E illustrates yet another alternative shape for the notches of the frame of FIG. 5A;

FIG. 5F illustrates yet another alternative shape for the notches of the frame of FIG. 5A;

FIG. 5G illustrates the use of the notches in conjunction with receptacles having varying shapes;

FIG. 5H illustrates the use of the notches on rims presenting various profiles;

FIG. 6A illustrates a receiving portion into a receptacle for accepting the frame of FIG. 4A;

FIG. 6B illustrates a foot portion of the frame of FIG. 4A;

FIG. 6C illustrates an alternative foot portion of the frame of FIG. 4A;

FIG. 6D illustrates another alternative foot portion of the frame of FIG. 4A;

FIG. 8B is a cross-section of the handle of FIG. 8A wherein the handle is locked to the frame;

FIG. 8C is a cross-section of the handle of the frame of FIG. 8A wherein the handle is freely pivotable with respect to the frame;

FIG. 8D is a cross-section of the handle of FIG. 8A locked to the frame at an angle different from an angle into which the handle is locked into FIG. 8B;

FIG. 23A illustrates an alternative frame including an alternative foot portion; and FIG. 23B illustrates yet another frame including yet an alternative foot portion.

Figures 1A, 1B:
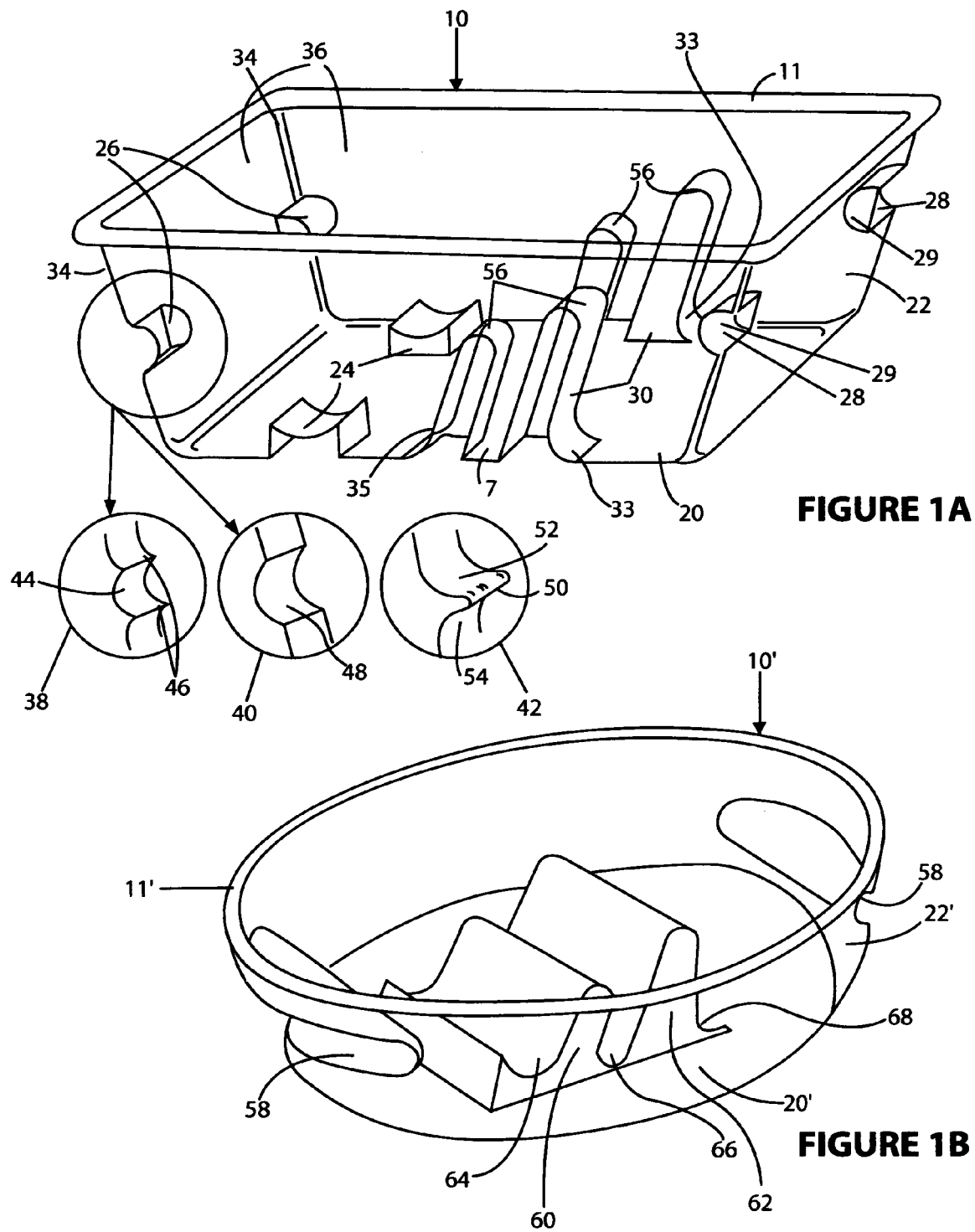
FIG. 1A is a perspective view of a receptacle including a plurality of receiving portions.
FIG. 1B illustrates an alternative receptacle having a plurality of receiving portions.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessary to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

The drawings illustrate a multi-purpose apparatus, including a receptacle 10 and a main frame 12, for receiving accessories. The reader skilled in the art will readily appreciate that in some embodiments of the invention, the frame 12 along with the accessories could be used with any suitable receptacle, or even without any receptacle.

In addition, the receptacle 10, the frame 12 and the accessories described below include many features, some of which are mutually exclusive. Once more, the readers skilled in the art will readily appreciate that some embodiments of the invention do not necessarily include all the features described below. In addition, in the drawings, each drawing includes only a limited set of features for clarity purposes. Consequently, the drawings should not be interpreted as restricting a number of features that can be incorporated in any particular embodiment of the invention.

Figure 4A:
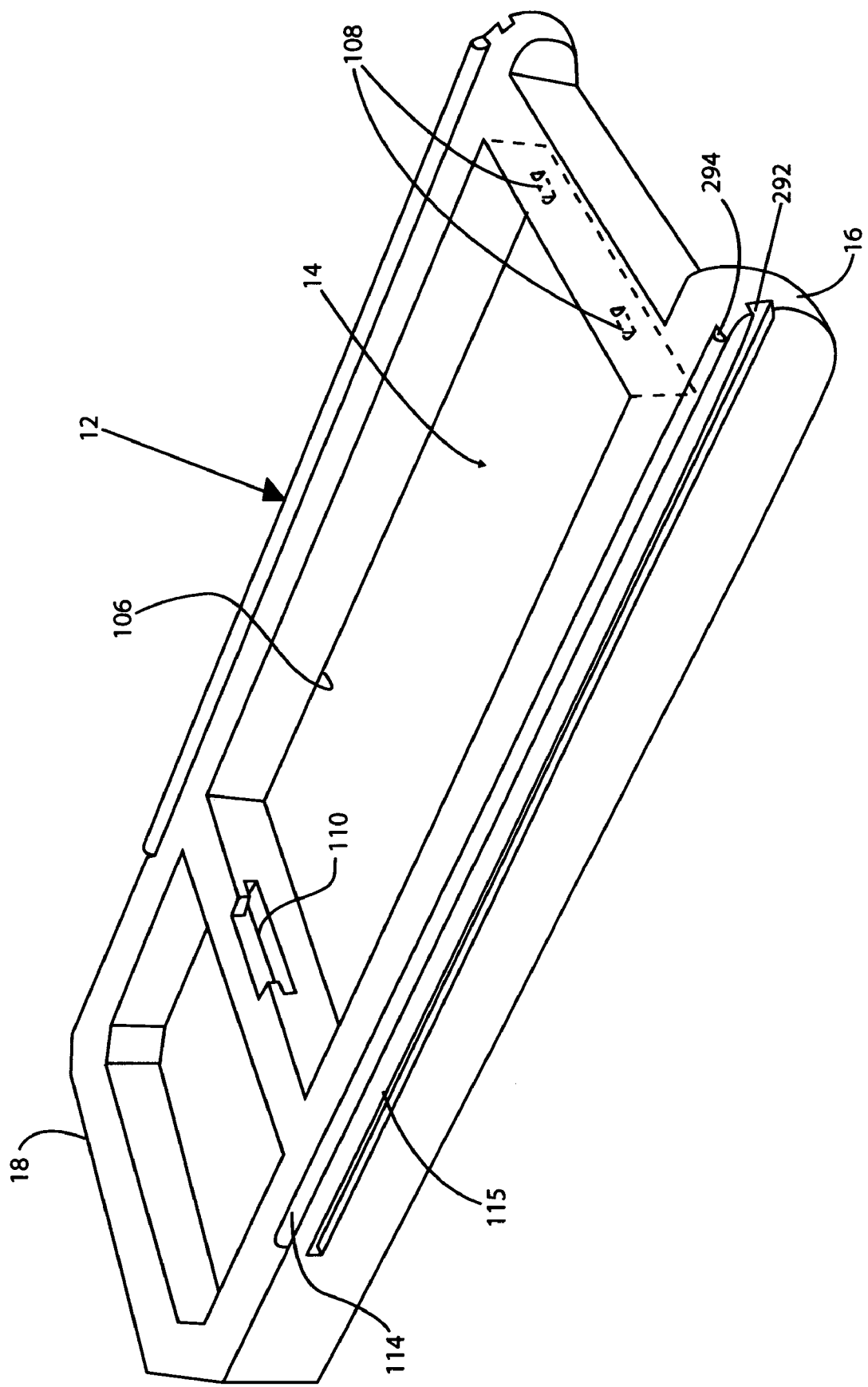
FIG. 4A illustrates in more details the frame of FIG. 2.

FIG. 4A illustrates an embodiment of the frame 12, including an accessory receiving portion 14 connected to a foot portion 16 and a handle 18, provided opposite to the foot portion 16 with respect to the accessory receiving portion 14. The handle 18 allows an intended user to hold the frame 12. The accessory receiving portion 14 removably receives accessories that will be described in further detail below. The foot portion 16 is configured and sized so as to be received within receiving portions included in the receptacle 10. The frame 12 will be described in further detail below.

Turning to FIG. 1A-D, there is shown an embodiment of the receptacle 10. The receptacle 10 defines a base wall 20 connected to a peripheral wall 22 defining a rim 11. The peripheral wall 22 includes flat portions 36 connected through corner portions 34. Receiving portions for receiving the foot portion 16 of the frame 12 take the form of protrusions 24, 26, 28, 30 and 32 extending substantially inwardly into the receptacle 10 from the base and peripheral walls 20 and 22.

Protrusions 26 and 28 are provided on the peripheral wall 22 proximately to the corner portions 34. Protrusions 24, 30 and 32 extend simultaneously from the base wall 20 and the peripheral wall 22. The protrusions 30 and 32 define a groove 7 therebetween and provide respectively, in a specific embodiment of the invention, substantially concave surfaces 33 and 35 proximally to the base wall 20. The reader skilled in the art will readily appreciate that alternative embodiments of the receptacle 10 can include protrusions extending solely from the side walls 36 and/or the base wall 20.

In a specific embodiment of the receptacle 10, protrusions 26 and 28 include a substantially convex surface 29. However, as shown in inserts 38, 40 and 42, protrusions 26 and 28 can take alternative forms in alternative embodiments of the invention. As shown in insert 38, protrusions 26 and 28 can include a substantially concave surface 44 delimited by two lips 46. Alternatively, as shown in insert 40, protrusions 26 and 28 can take the form of a protrusion extending substantially outwardly from the receptacle 10. In this case, in the specific embodiment, protrusions 26 and 28 include a substantially concave surface 48. In yet another embodiment of the invention, as shown in insert 42, protrusions 26 and 28 take the form of a lip 50 defining two concave surfaces 52 and 54.

Protrusions 30 and 32 take the form of substantially elongated protrusions including substantially convex surfaces 56 extending away from the base wall 20. Protrusions 30 extend away from the base wall 20 substantially more than protrusions 32.

As shown in FIGS. 1C, 1D, 1E, 1F, 1G, 1H and 1I the receptacle 10 is capable of supporting the frame 12 in a plurality of configurations. In these figures, the frame 12 and the receptacle 10 are represented only schematically without all their associated features. Also, these figures illustrate the protrusions 26 and 28 taking the different forms illustrated on FIG. 1A and in inserts 38 and 42. FIGS. 1C to 1H should not be used to limit the different configurations into which the frame 12 is supported by the receptacle 10 in alternative embodiments of the invention.

Figure 1C:
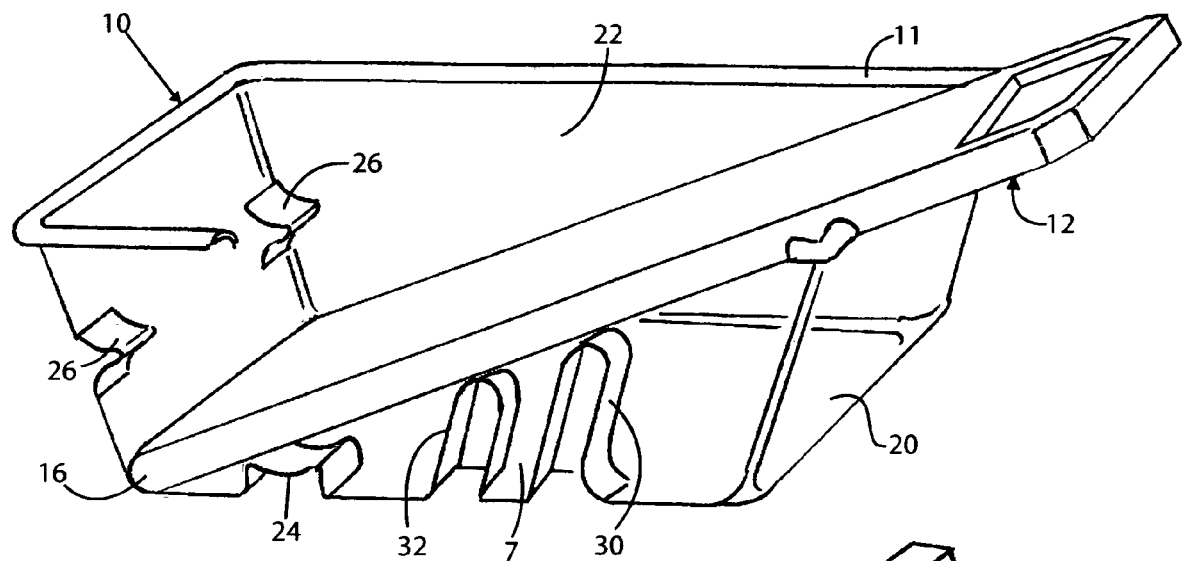
FIG. 1C illustrates a frame supported by the receptacle of FIG. 1A in a first configuration.

FIG. 1C illustrates schematically the frame 12 supported within the receptacle 10 at an angle of substantially 40 degrees with respect to the base wall 20. The foot portion 16 of the frame 12 abuts the peripheral wall 22 and the base wall 20 with the frame 12. The frame 12 also abuts the rim 11 of the receptacle 10. In a specific embodiment of the invention, and as shown in FIG. 1C, notches provided in the frame 12 engage the rim 11. These notches are described in further details set forth below. In other embodiments of the invention, the frame does not include notches and therefore directly contact the rim 11.

Figure 1D:
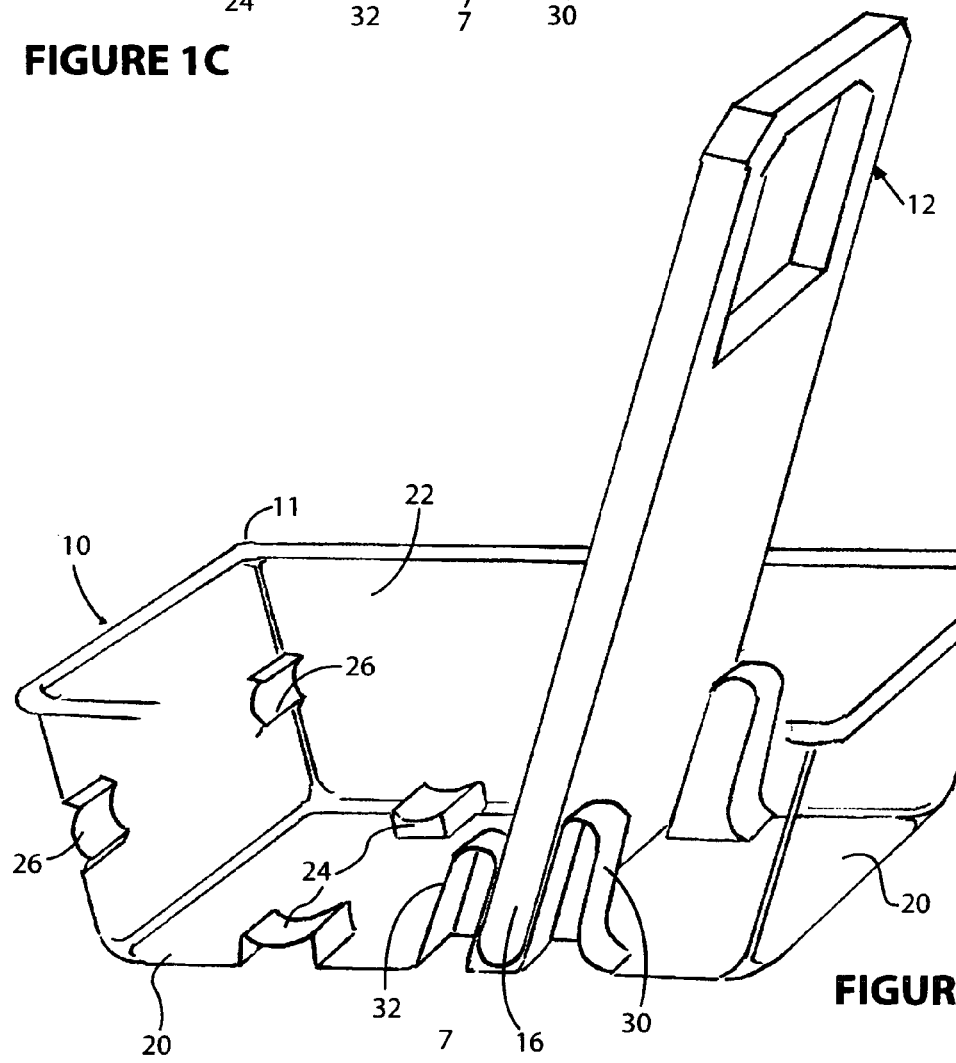
FIG. 1D illustrates the frame of FIG. 1C supported by the receptacle of FIG. 1A in a second configuration.

FIG. 1D illustrates schematically the frame 12 supported within the receptacle 10 at an angle of substantially 75 degrees with respect to the base wall 20. The foot portion 16 of the frame 12 is inserted into the groove 7. In specific embodiments of the invention, the protrusions 30 and 32 are spaced and configured such that the frame 12 is supported loosely, snuggly or frictionally within the groove 7.

Figure 1E:
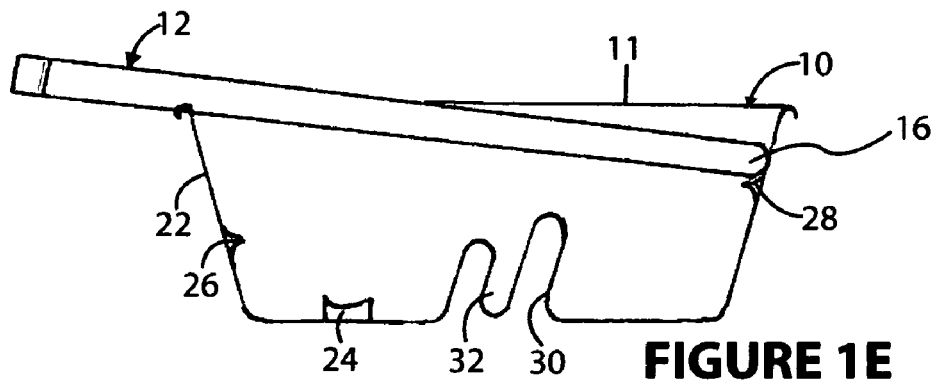
FIG. 1E illustrates the frame of FIG. 1C supported by the receptacle of FIG. 1A in a third configuration.

FIG. 1E illustrates schematically the frame 12 supported within the receptacle 10 at an angle of substantially 15 degrees with respect to the base wall 20. The foot portion 16 of the frame 12 abuts the protrusions 28. While not all shown in the drawings, the reader skilled in the art will readily appreciate that in specific embodiments of the invention the frame 12 abuts one of the concave surfaces 44, 48, 52 or 54. The frame 12 also abuts the rim 11 of the receptacle 10. As mentioned hereinabove, in specific embodiments the frame 12 includes or does not include notches for engaging the rim 11.

Figure 1F:
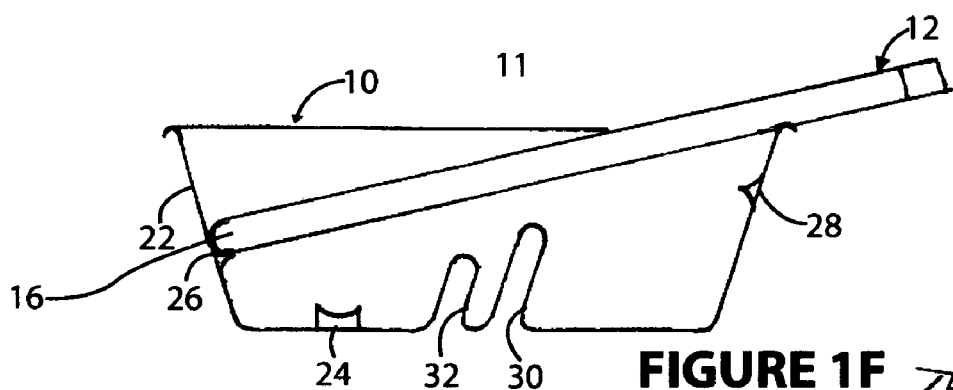
FIG. 1F illustrates the frame of FIG. 1C supported by the receptacle of FIG. 1A in a fourth configuration.

FIG. 1F illustrates schematically the frame 12 supported within the receptacle 10 at an angle of substantially 30 degrees with respect to the base wall 20. The foot portion 16 of the frame 12 abuts the protrusions 26. While not all shown in the drawings, the reader skilled in the art will readily appreciate that in specific embodiments of the invention the frame 12 abuts one of the concave surfaces 44, 48, 52 or 54. The frame 12 also abuts the rim 11 of the receptacle 10. As mentioned hereinabove, in specific embodiments the frame 12 includes or does not include notches for engaging the rim 11.

Figure 1G:
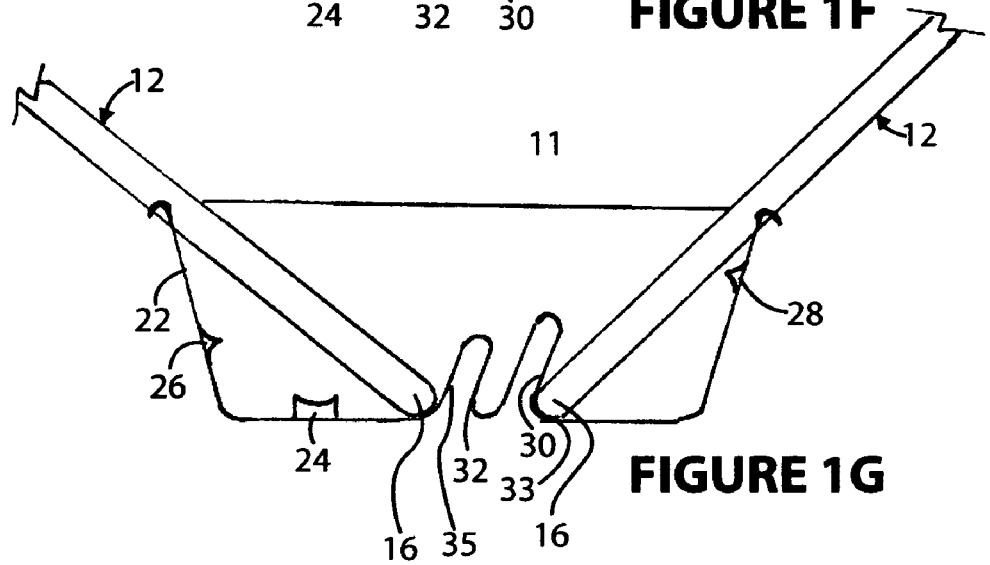
FIG. 1G illustrates the frame of FIG. 1C supported by the receptacle of FIG. 1A in a fifth configuration.

FIG. 1G illustrates schematically the frame 12 supported within the receptacle 10 at angles of substantially 45 or 60 degrees with respect to the base wall 20. To that effect, the foot portion 16 of the frame 12 abuts respectively the protrusions 32 and 30, and more specifically the concave surfaces 35 and 33 if present in the receptacle 10. The frame 12 also abuts the rim 11 of the receptacle 10. As mentioned hereinabove, in specific embodiments the frame 12 includes or does not include notches for engaging the rim 11.

Figure 1H:
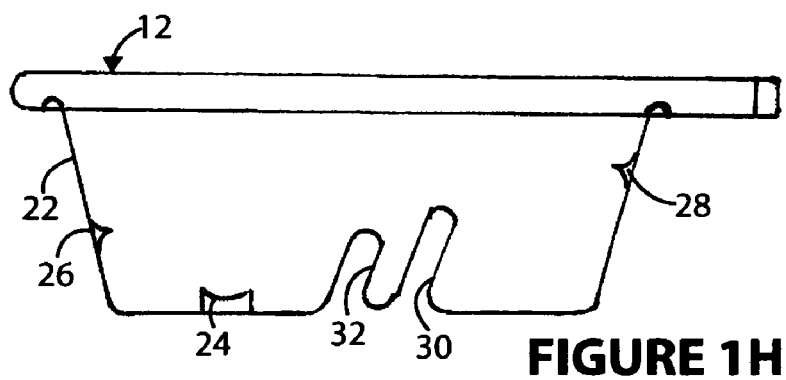
FIG. 1H illustrates the frame of FIG. 1C supported by the receptacle of FIG. 1A in a sixth configuration.
Figure 1L:
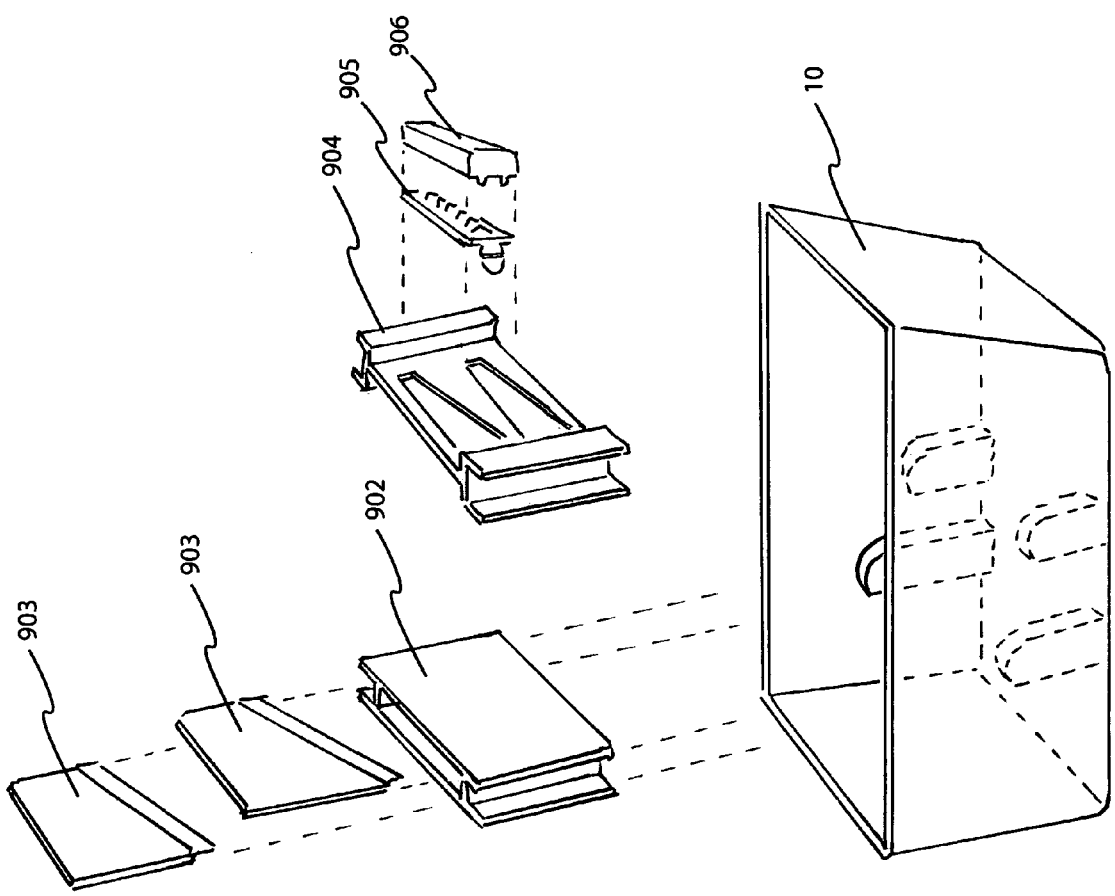
FIG. 1I illustrates the container with the blades and blade holders and inserts.

FIG. 1H illustrates schematically the frame 12 supported substantially horizontally on top of the receptacle 10 through the rim 11. As mentioned hereinabove, in specific embodiments the frame 12 includes or does not include notches for engaging the rim 11.

FIG. 1I shows blades 903 and 905 and blade holder 902 and 904 inserted into container 10 and blade protector 906.

In a last configuration, the protrusions 24 support the foot portion 16 of the frame 12, such that the frame 12 can be angled continuously from substantially 45°-75° with respect to the base wall 20. This particular configuration is described in further details set forth below.

The reader skilled in the art will readily appreciate that all the angles mentioned hereinabove with respect to the description of FIGS. 1C to 1H are not critical to the invention. Accordingly, in alternative embodiments of the invention the receptacle 10 is configured to support the frame 12 at any suitable angles.

Advantageously, protrusions 26 and 28 in the embodiment of the receptacle 10 shown in FIG. 1A allow a user to insert fingers into the protrusions 26 and 28 to hold the receptacle 10. The protrusions 26 and 28 then provide handles for handling the receptacle 10.

An alternative receptacle 10' is shown in FIG. 1B. The alternative receptacle 10' includes a substantially curved peripheral wall 22' defining a rim 11' connected to a base wall 20'. Receiving portions in the form of protrusions 58 extending substantially inwardly into the receptacle 10' from the peripheral wall 22', and protrusions 60 and 62 extend substantially inwardly into the receptacle 10' from the base wall 20'. Protrusions 58, along with the rim 11', allow the receptacle 10' to receive the frame 12 similarly to the manner in which the receptacle 10 received the frame 12. Also, in some embodiments of the invention, protrusions 58 form handles to manipulate the receptacle 10'.

Protrusions 60 and 62 define a substantially concave surface 64, a groove 66, and another substantially concave surface 68. In a specific embodiment of the receptacle 10' shown in FIG. 1B, the protrusion 60 and 62 present a substantially uniform cross-section. The concave surface 64 allows receiving the frame 12 in substantially the same manner as the protrusions 24 of the receptacle receive the frame 12. Also, the groove 66 receives the frame 12 in substantially the same manner that the groove 7 receives the frame 12. The substantially concave surface 68 receives the frame 12 in substantially the same manner that the substantially concave surfaces 33 and 35 receive the frame 12.

Also, while the receptacle 10 shown in FIGS. 1A is of a substantially rectangular shape, and the receptacle 10' shown in FIG. 1B is of a substantially elliptical shape, alternative embodiments of the receptacle can take any suitable shape such as a square, a circle and an oval, among others.

Figure 3A:
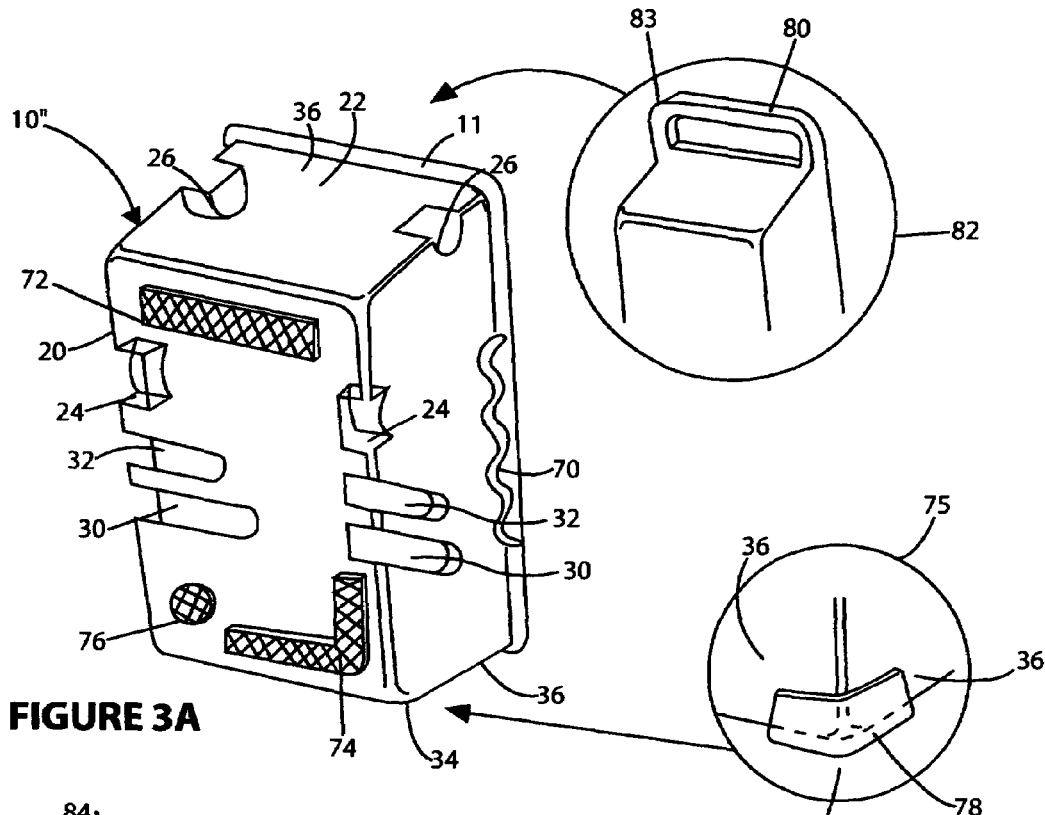
FIG. 3A is a perspective view of an alternative receptacle.

FIG. 3A shows an alternative embodiment 10" of the receptacle 10. The receptacle 10" includes anti-slip features and a handle 70. The anti-slip features take the form of relatively thin pieces of material having a relatively high coefficient of friction with typical work surfaces used in kitchens. For example, the thin stripes include rubber, among other materials.

As shown in FIG. 3A, the anti-slip features take many alternative forms, such as a substantially elongated strip 72, a substantially L-shaped strip 74 or a substantially circular strip 76. In addition, as shown in insert 75, in an alternative embodiment of the invention the anti-slip feature takes the form of a piece of material 78 conforming to the shape of the container and covering in part, simultaneously an exterior portion of the base wall 20 along with the exterior portion of two flat portion 36 and a corner portion 34. The anti-slip features are affixed to the container 10" in any suitable manner such as, for example, through the use of glue. The reader skilled in the art will readily appreciate that any number of strips of one or more of the types described hereinabove can be affixed to the container 10". Accordingly, FIG. 3A is only for illustrative purposes and should not be used to constrain the number and types of strips present in specific embodiments of the invention.

The handle 70 takes the form of a flange extending from the rim 11. Alternatively, an alternative handle 80 shown in an insert 82 of FIG. 3A, is provided on receptacle 10" in the form of a substantially elongated, curved member 83 extending outwardly from the peripheral wall 22.

Figure 3B:
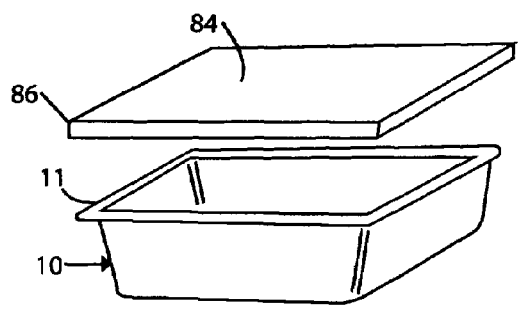
FIG. 3B is a schematic view of the shape of the receptacle of FIG. 1A.

In other embodiments of the invention, the receptacle 10 further includes a lid 84 removably attachable to the rim 11, for example through a frictional engagement of a periphery 86 of the lid 84 with the rim 11 (shown in FIG. 3B).

Figure 3C:
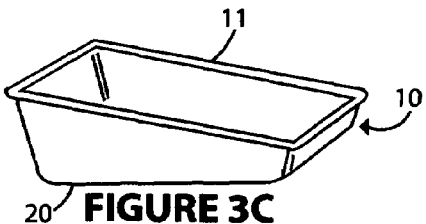
FIG. 3C is a schematic view of an alternative shape to the shape of FIG. 3B.

In alternative embodiment of the receptacle 10 shown in FIG. 3C, the rim 11 is angled at an acute angle with respect to the base wall 20.

Figure 3D:
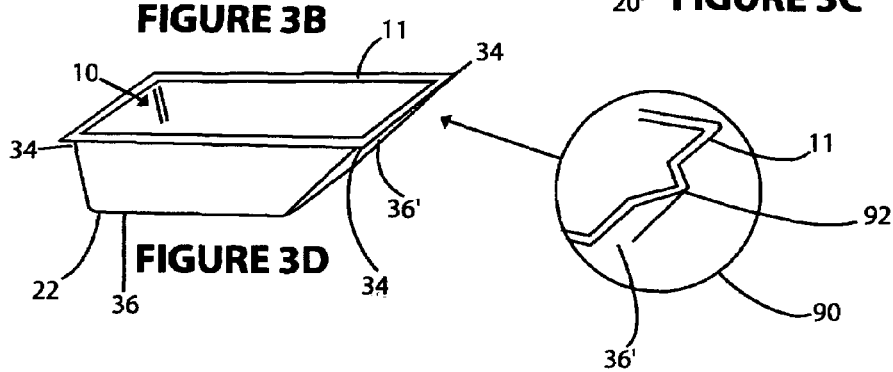
FIG. 3D is a schematic view of an alternative shape to the shape of FIG. 3B.

In yet another embodiment of the receptacle 10, shown in FIG. 3D, one of the flat portions 36, flat portion 36' is angled at an acute angle with respect to the base wall 20. In this embodiment, corner portions 34 adjacent to the flat portion 36' are usable as spouts.

Alternatively, as shown in insert 90, a separate spout 92 is provided in flat portion 36'. The reader skilled in the art will readily appreciate that alternative embodiments of the receptacle 10 are within the scope of the invention. Accordingly, the drawings should not be construed as restricting the shape of the receptacle and features included therein.

Figure 21:
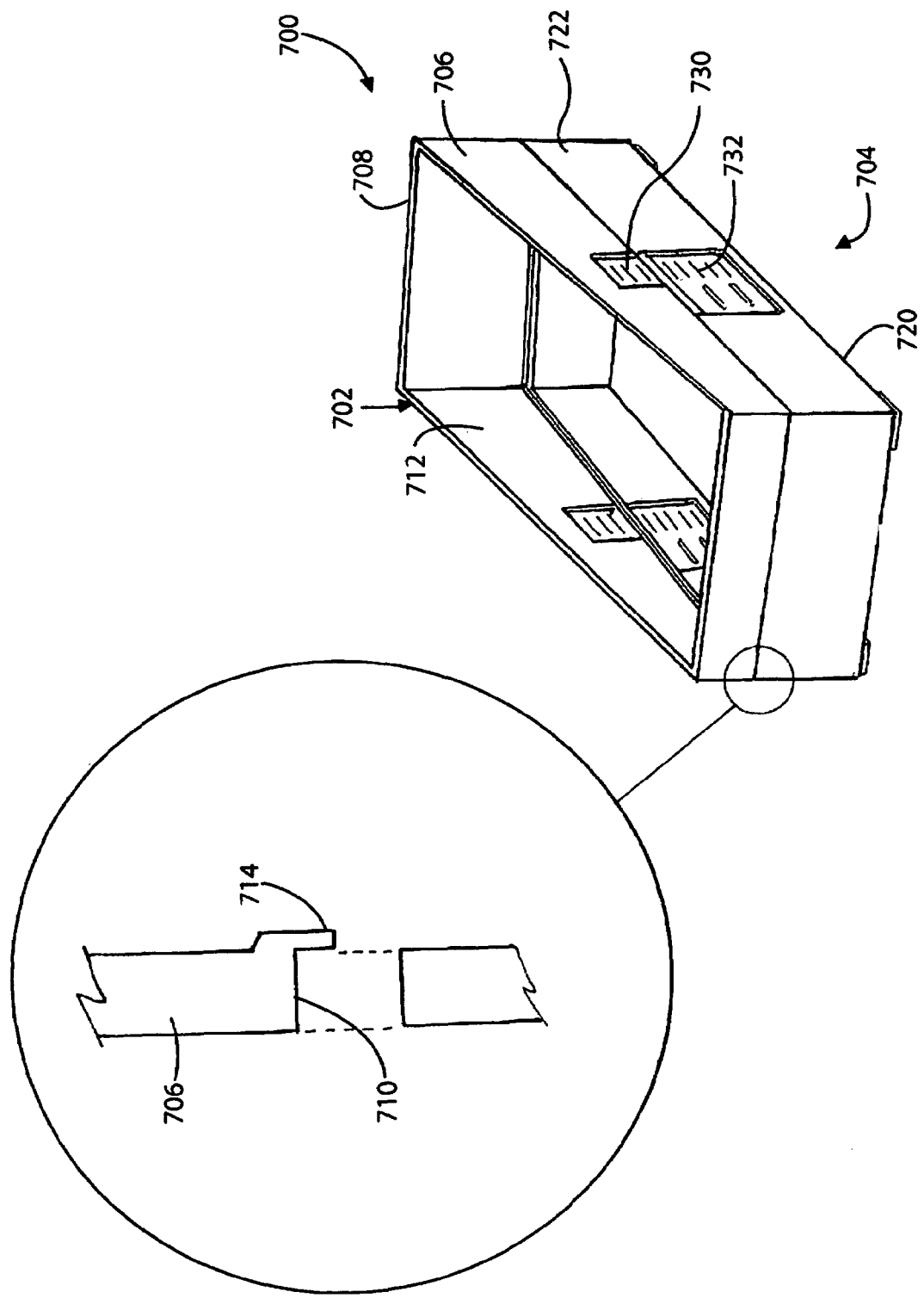
FIG. 21 is a perspective view of a two-parts receptacle.
Figure 22:
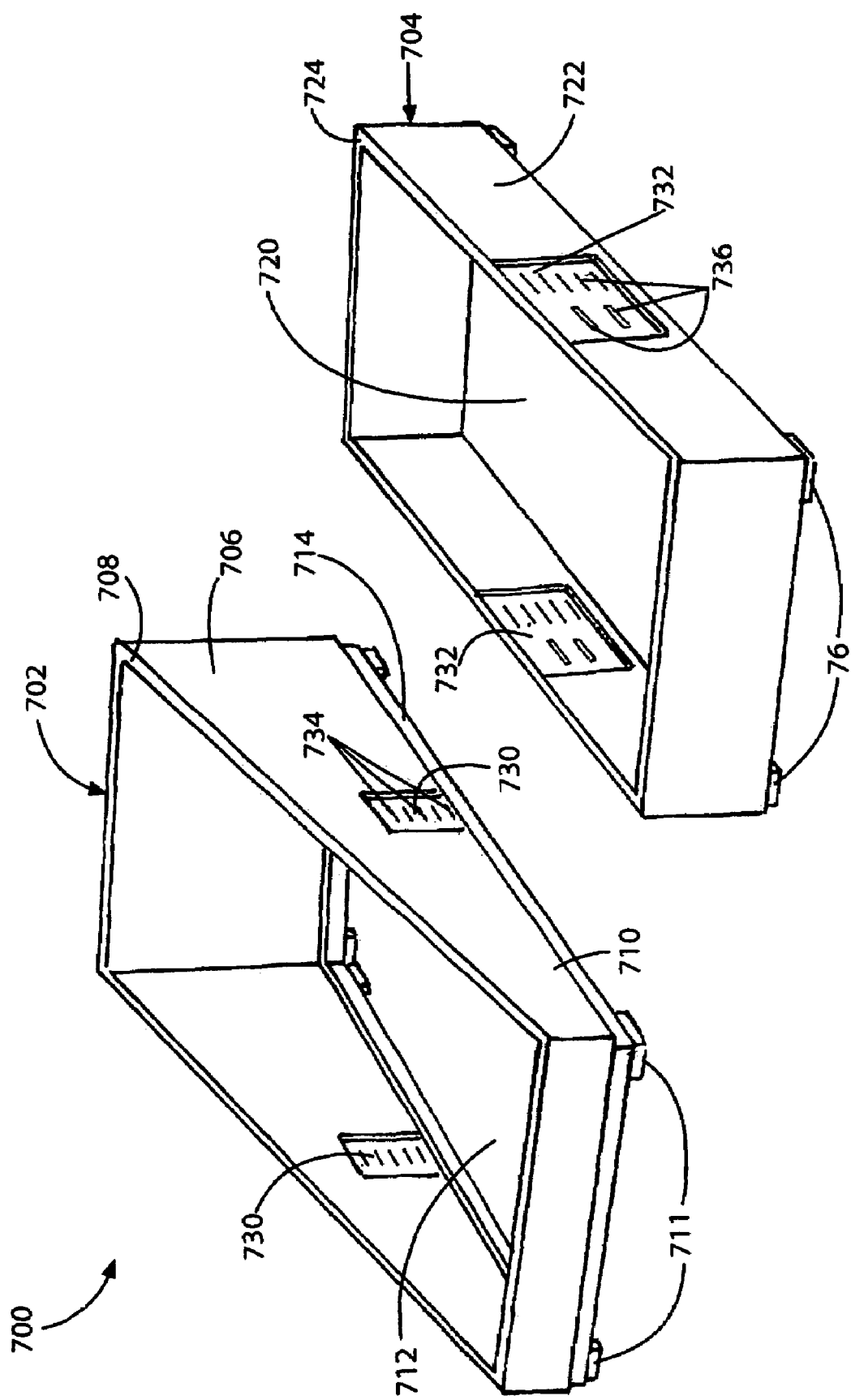
FIG. 22 is a perspective view of the receptacle of FIG. 21 with the two parts separated.

FIGS. 21 and 22 illustrate a two-part receptacle 700. The receptacle 700 includes a first part 702 and a second part 704. The first part 702 is superimposable on the second part 704. The first and second parts 702 and 704 are configured to support the frame 12, especially, but not essentially, when the frame 12 includes notches, as described in more details set forth below.

The first part 702 includes a peripheral wall 706 defining an upper rim 708 and a lower rim 710. The peripheral wall 706 further defines a passageway 712.

The lower rim 710 includes a flange 714 extending into the passageway 712 and substantially parallel to the peripheral wall 706. The flange 714 engages the second part 704 as described in more details set forth below.

In a specific embodiment of the invention, the upper rim 708 is acutely angled with respect to the lower rim 710. Therefore, when the lower rim 710 is substantially parallel to a working surface, the upper rim 708 supports the frame 12 at an acute angle with respect to the working surface. This acute angle allows, in some instances, a more ergonomic use of the accessories received by the frame 12.

As better shown in FIG. 22, in some embodiments of the invention, but not essentially, the first part 702 includes feet 711 for supporting the first part 702 on a surface when the first part 702 is not superposed on the second part 704. The feet 711 are any suitable feet, such as corner-shaped extensions of the flange 710, as shown in the drawings.

The second part 704 includes a bottom wall 720 connected to a peripheral 722 defining a rim 724. The rim 724 is configured and sized to support the lower rim 710 and to engage the flange 714. In some embodiments of the invention, the flange 714 frictionally engages the rim 724, while in other embodiments of the invention, the flange 714 only abuts the rim 724.

In some embodiments of the invention, the peripheral wall 722 and the peripheral wall 706 define a generally continuous surface when the first part 702 is positioned over the second part 704.

In some embodiments of the invention, but non-essentially, the first and second parts 702 and 704 include respectively substantially transparent windows 730 and 732. The windows 730 and 732 allow an intended user to view an amount of food contained within the receptacle 700.

In addition, in some embodiments of the invention, the windows 730 and 732 include measuring marks 734 and 736 in the form of printed marks or relief provided, among others, on the windows 730 and 732. The measuring marks 734 and 736 optionally include measure indications indicative of a quantity of food contained within the receptacle 700.

In some embodiments of the invention the receptacle 700 includes any of the above-described features of the receptacles described hereinabove, such as handles, anti-slip features and protrusions for receiving the frame 12.

Also, in alternative embodiments of the invention, the first and second parts 702 and 704 are releasably attachable in any suitable way.

Figure 2:
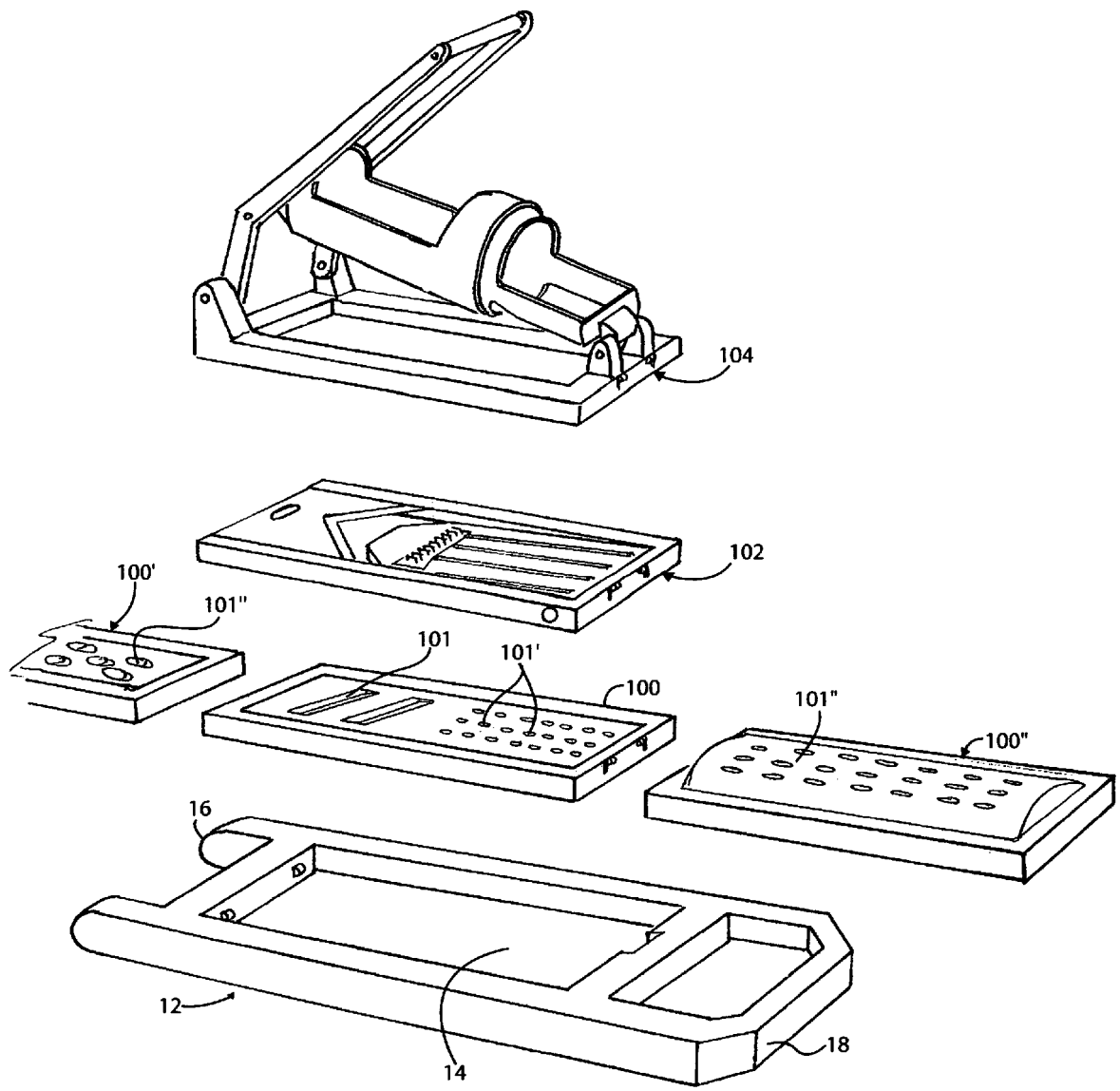
FIG. 2 is a perspective view of a frame and of a plurality of inserts insertable within the frame.

As shown in FIG. 2, the frame 12 removably attaches through the accessory receiving portion 14 a food processing portion for processing a piece of food, the food processing portion taking the form of an accessory. Examples of accessories shown in FIG. 2 include grater inserts 100, 100' and 100", a mandolin insert 102 and a piston operated food processing device insert 104. However, the reader skilled in the art will readily appreciate that any other suitable accessory could be used with the frame 12. In addition, it is within the scope of the invention to have a food processing portion which is permanently attached, or connected, to the frame 12.

It should be appreciated that the frame 12, as shown in FIG. 2, does not include all the features of the frame 12 as shown in FIG. 4A. However, the absence of these features is only for clarity purposes and should not be interpreted as an indication of their essentiality, or lack thereof, in the invention.

Figure 4D:
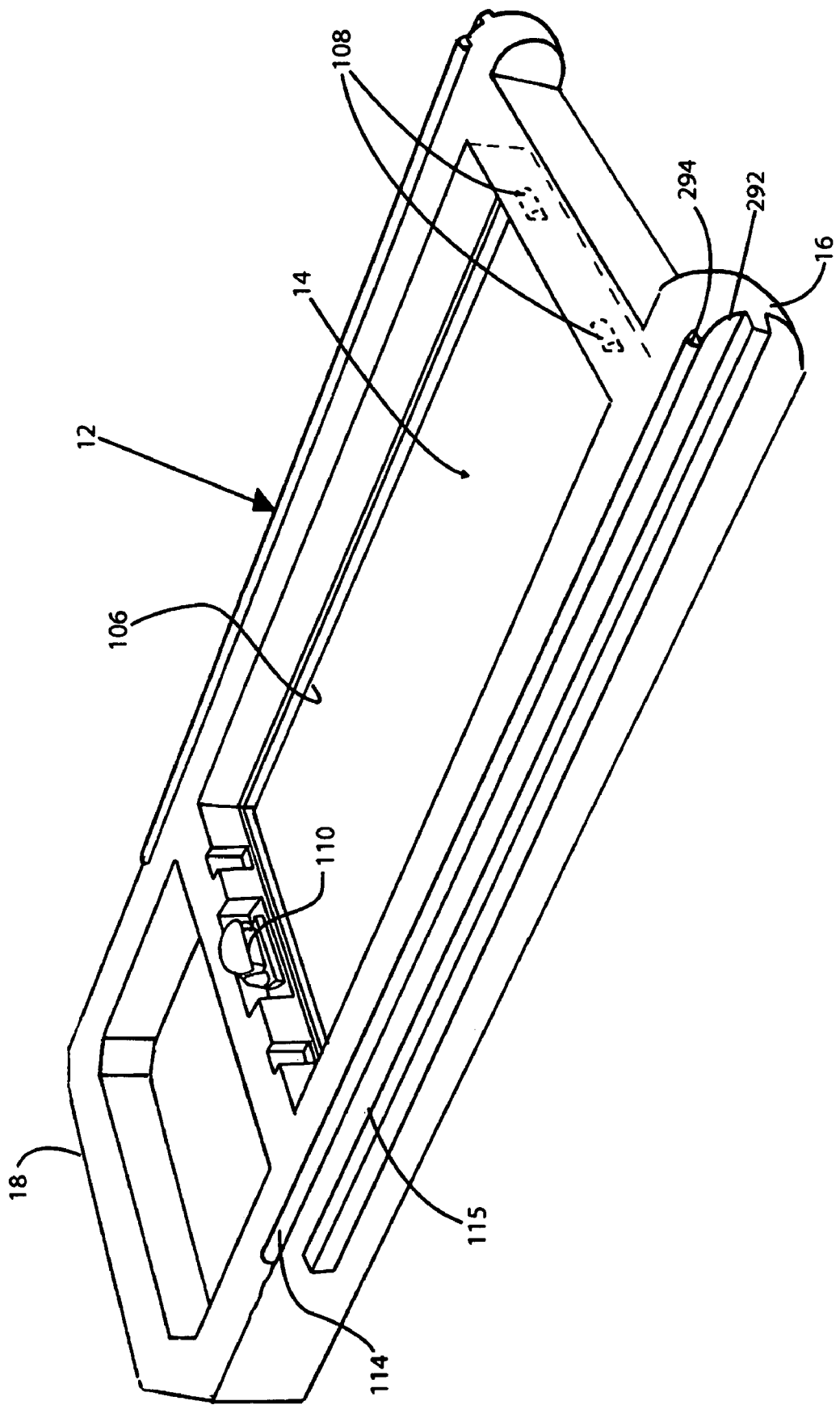
FIG. 4D illustrates another embodiment of the main frame.
Figure 4E:
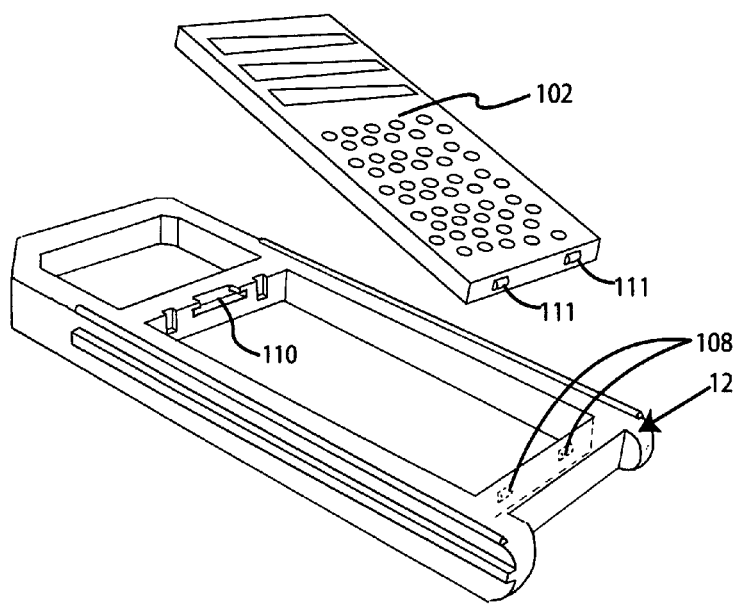
FIGS. 4E-F illustrate the invertability of the insertable implement in relation to the main frame.
Figure 4F:
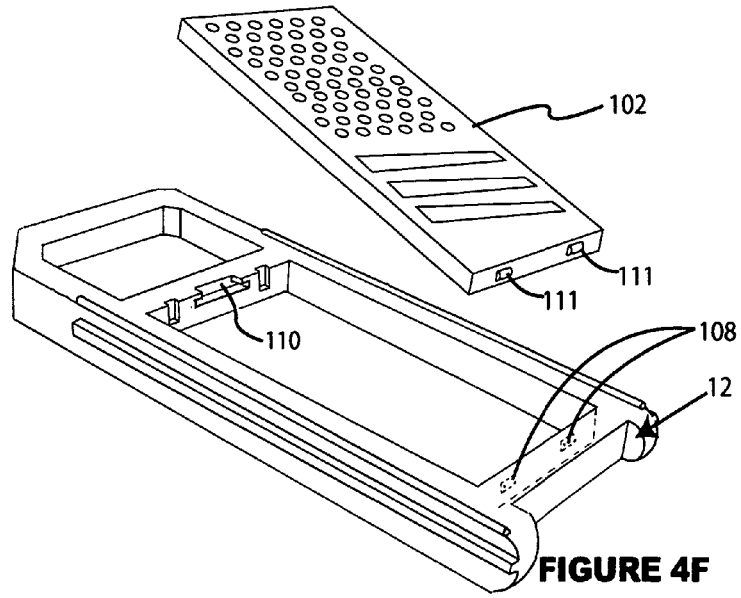

As shown better on FIGS. 4A, 4B, 4C and 4D, the frame 12 includes a cavity 106 for receiving the accessories. The accessories are releasably attached within the cavity 106, through recesses 108 and a notch 110. When the accessory is attached to the frame 12, a flexible tongue 111 provided on the accessory is received by the notch 110, and bumps 112 provided also on the accessory engages the recesses 108. The recesses 108 maintain one extremity of the accessory within the frame 12 while the tongue 111 and the notch 110 frictionally maintain an opposite extremity of the accessory within the frame 12. In alternative embodiments of the invention, the accessories are removably attachable to the frame 12 using any other suitable method known in the art. In FIG. 4D, another embodiment shows a locking mechanism 908 with a snapping feature. In this embodiment, the protrusion 992 is designed for receiving the elongated ridge of the attachment. FIGS. 4E and F show how the insertable implement 102 is reversible.

The frame 12 further includes two guides 114 and 115 for slidably attaching a slider thereto. The slider will be described in further details set forth below.

FIG. 5A shows an embodiment of the frame 12, frame 12', including a plurality of notches 120. The notches 120 allow the positioning of the frame 12' over a receptacle 116 defining a rim 118. The receptacle 116 can be any receptacle including, but not limited to, receptacles 10, 10' and 10" described hereinabove. The notches 120 receive the rim 118 so as to substantially restrict a motion of the frame 12' when the frame 12' is positioned above the receptacle 116.

When many notches 120 are included in the frame 12', the frame 12' is positionable over receptacles having many different shapes and dimensions.

As shown in FIGS. 5B, 5C, 5D, 5E and 5F, the notches 120 can take many shapes. FIG. 5B shows a notch 120 having substantially hemi-circular first and second portions 126 and 128. The first substantially hemi-circular portion 126 receives the rim 118. If the rim 118 had a width less than a predetermined width, the rim 118 is further received by the second portion 128. However, if the rim 118 has a width greater than the predetermined width, only the first portion 126 receives the rim 118. FIG. 5C shows an alternative notch 122 having a substantially hemi-circular shape.

FIG. 5D shows another alternative notch 130 having a substantially triangular shape. The substantially triangular shape allows a user to easily position the frame 12' over the rim 118. Additionally, the substantially triangular shape allows a user to maintain, with relatively great stability, the frame over the rim 118 even if a center of the notch 130 is not located such that the center of the notch 130 engages the rim 118. FIGS. 5E and 5F illustrate two other alternative notches 132 and 134. The notches 132 and 134 respectively each include a first portion in the form of substantially triangular and substantially hemi-circular bases 136 and 138. In addition, each of the notches 132 and 134 include a second portion 140 having a substantially elongated shape. The second portion 140 has a function similar to the second portion 128. However, in addition, as the second portion 140 is substantially elongated, in cases wherein the second portion 140 receives the rim 118, the stability of the frame 12' on the container 116 is greatly improved.

As shown on FIG. 5G, the notches allow to maintain the frame 12 on top of receptacles having shapes different from the receptacle 116. For example, the notches are able to engage rims 11a and 11b of receptacles 10a and 10b having a respectively generally a substantially hemispherical shape and a substantially parallelepiped shape with a relatively small rim.

FIG. 5H illustrates how notches 132, 120 and 130 engage rims 11c, 11d and 11e having different shapes. This figure is for illustrative purposes only and does not limit the shape of rims that can be engaged by any of the notches 132, 120 and 130. The notches 132, 120 and 130, along with any other suitable notches are shaped to engage partially or totally the rims 11c, 11d and 11e.

The notches 132 are useful for engaging relatively narrow rims 11c defined by relatively narrow peripheral walls. The notches 120 are useful for engaging relatively narrow rims 11d defined by relatively wide peripheral walls, which thereby define tapered rims. The notches 130 are useful for engaging relatively wide rims 11e defined by relatively wide peripheral walls. Therefore, differently profiled notches are useful for engaging rims having different profiles and dimensions.

As shown in FIG. 6A, the foot portion 16 is configured and sized to abut a concave surface 144 of a protrusion 145 provided within a receptacle 146. Alternatively, the foot portion 16 is configured and sized to abut concave surfaces of protrusions 24 and 60 provided within receptacles 10 and 10'. To that effect, the foot portion 16 includes a substantially convex portion 148 having a radius of curvature less than, or equal to, a radius of curvature of the concave surface 144.

As shown in FIG. 6B, the foot portion 16 includes in a particular embodiment of the invention a block of material 150 including the substantially convex portion 148. Block 150 is attached, or connected, to the frame 12.

FIGS. 23A and 23B illustrate alternative frames 812 and 812' including alternative foot portions 814 and 814'. Foot portions 814 and 814' have a cross-section similar to the cross-section of the foot portion 16 and each present a respective convex portion 818 and 818'. The foot portion 814 extends substantially across the whole frame 812, while the foot portion 814' extends only across part of the frame 812'.

In specific embodiments of the invention, foot portions 814 and 814' take many different forms. For example, foot portions 814 and 814' can take forms similar to the forms described below with respect to alternative forms of the foot portion 16.

FIGS. 6C and 6D show two alternative blocks 152 and 154. Both blocks include a substantially convex surface 148. Block 152 is similar to block 150, except that block 152 includes a substantially prism-shaped extension 151 for engaging a similarly shaped notch within the foot portion 16 (not shown in the drawings). In this embodiment of the invention, the block 152 is removable from the frame 12.

In FIG. 6D, the block 154 includes the convex portion 148 and two substantially concave portions 156. The concave portions 156 are provided between the rest of the frame 12 and the convex surface 148. The general shape of block 154 allows positioning of the frame 12 within the concave surface 144 over a relatively large range of angles with respect to the base wall 20 as the concave portions 156 allow leaning the frame 12 within the container 146 without the block 154 contacting the protrusion 145.

In a specific embodiment of the invention, blocks 150, 152 and 154 include a material having a relatively large coefficient of friction with the receptacle 10 or 10'. An example of such a material is rubber. However, any suitable material can be used without departing from the scope of the invention. In addition, in some embodiments of the invention, the material included in blocks 150, 152 and 154 also has a relatively large coefficient of friction with any working surface suitable for use with the frame 12.

The reader skilled in the art will readily appreciate that the feet portions described hereinabove are for illustrative purposes only and that any other suitable foot portion is within the scope of the invention. In addition, the connections between frames and blocks of feet portions described hereinabove are also examples and some embodiments of the invention can include other such connections without departing from the scope of the invention.

FIGS. 7A to 7E, along with FIGS. 8A to 8D and 9 illustrate a plurality of handles that can be present in embodiments of the frame 12. However, the reader skilled in the art will readily appreciate that the frame 12 could either include no handle, or include any other suitable handle not shown in the drawings. Also, the frame 12, as shown in FIGS. 7A to 7E, 8A to 8D and 9 does not include all the features described hereinabove. However, the reader skilled in the art will also readily appreciate that any suitable features chosen from the features described hereinabove and hereinbelow can be incorporated into the frame 12 without detracting from the scope of the invention.

Figure 7A:
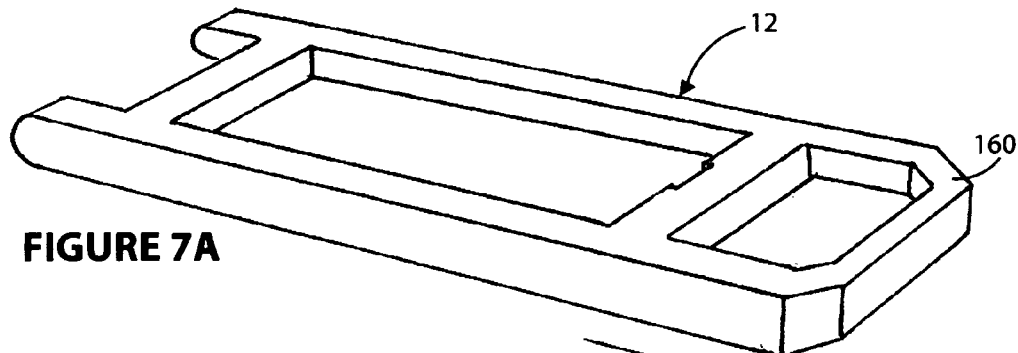
FIG. 7A illustrates a frame having a handle.
Figure 7B:
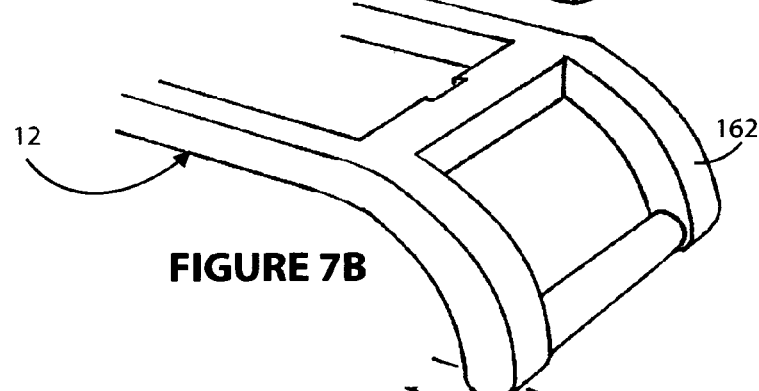
FIG. 7B illustrates the frame of FIG. 7A with an alternative handle.

As shown in FIG. 7A, the handle can take the form of a loop formed by an elongated member extending integrally from the frame 12. In FIG. 7A, a handle 160 is substantially coplanar with the rest of the frame 12. However, as shown in FIG. 7B, an alternative handle 162 is substantially non-coplanar with the rest of the frame 12.

Figure 7C:
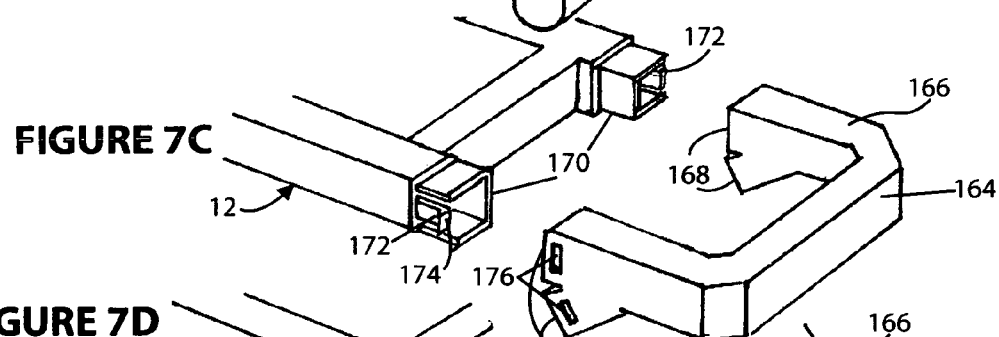
FIG. 7C illustrates the frame of FIG. 7A with a detachable handle in a first orientation.
Figure 7D:
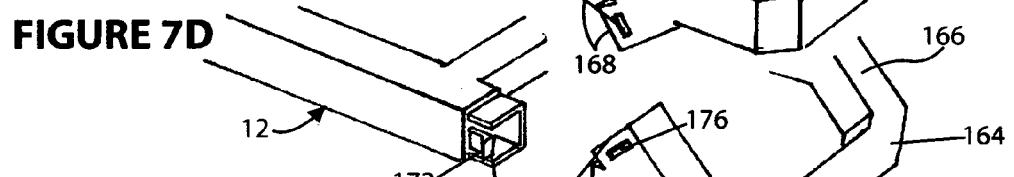
FIG. 7D illustrates the frame of FIG. 7A with a detachable handle in a second orientation.
Figure 7E:
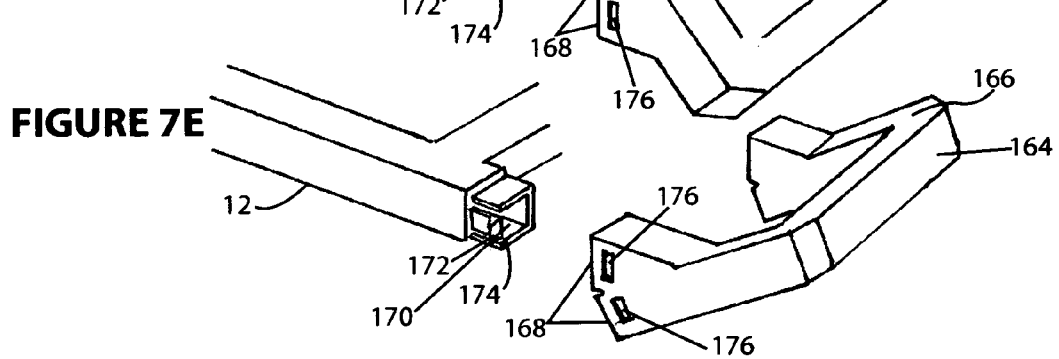
FIG. 7E illustrates the frame of FIG. 7A with a detachable handle in a third orientation.

In another embodiment of the invention, a handle 164 is detachable from the rest of the frame 12. As shown in FIGS. 7C to 7E, the handle 164 takes the form of a substantially hemi-circular tubular member 166 connected to receiving portions 168. In addition, the tubular member 166 ends at both extremities in similarly shaped connecting portions 168.

Each of the connecting portions 168 is configured and sized to engage a corresponding connecting portion 170 provided on the frame 12. The receiving portions 170 each include a deflectable tongue 172, including a projection 174. Upon insertion of one of the receiving portions 168 onto one of the receiving portions 170, the tongue 172 is deflected until the protrusion 174 reaches an aperture 176 provided in the receiving portions 168.

Therefore, the handle 164 can be locked to the rest of the frame 12 through an engagement of the protrusion 174 into the aperture 176. To unlock the handle 164 from the frame 12, a user depresses the tongues 172 through the protrusions 174, such as to allow removal of the handle 164. As shown in FIGS. 7C to 7E, the handle 164 is positionable in a plurality of configurations onto the frame 12 as some of the connecting portions 168 are acutely angled with respect to some other connecting portions 168.

Figure 8A:
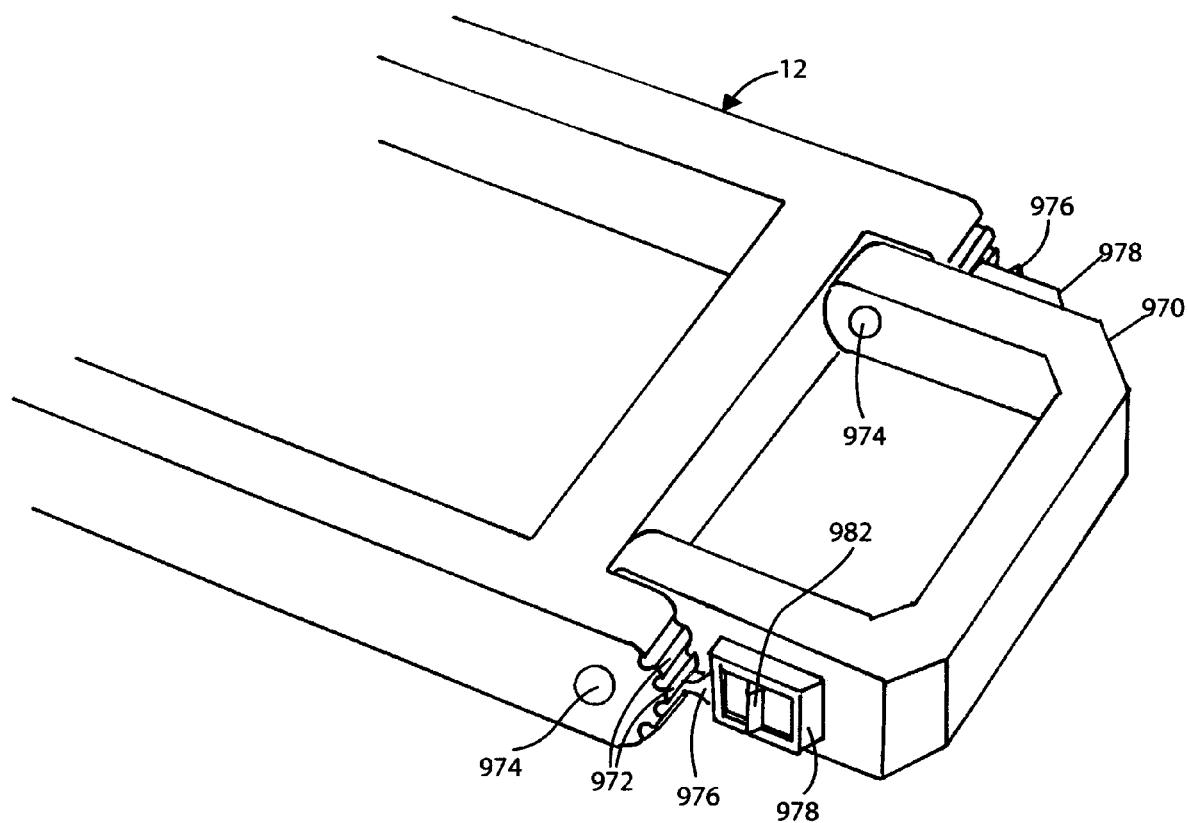
FIG. 8A illustrates a frame similar to the frame of FIG. 7A including a pivotable handle.

In an alternative embodiment of the invention, as shown on FIG. 8A, the frame 12 includes a pivotable handle 970. To that effect, the frame 12 is provided with a plurality of grooves 972 provided at an extremity opposite the foot portion 16 and oriented at a plurality of different angles with respect to each other. The pivotable handle 970 is pivotably attached to the frame 12 through axles 974. The biased pins 976 provided on the handle 970 engages the grooves 972.

FIGS. 8B to 8D illustrate in more detail the operation and the structure of the handle 970. As shown in FIG. 8B, the pin 976 is maintained within an enclosure 978, and biased towards the grooves 972, by a biasing element in the form of a spring 980 provided within the enclosure 978. Protrusion 982 provided on the pin 976 allows an intended user to move the pin 976 away from one of the grooves 972 it is engaging.

As shown in FIG. 8C, when the pin 976 is moved away from the grooves 972, the handle 970 is freely pivotable on the frame 12. Then, as shown in FIG. 8D, the pin 976 can be released to engage another of the grooves 972 such that the handle 970 is locked to the frame 12 at an angle different from the angle at which it is locked on FIG. 8B. Handles, and methods, for attaching handles to frames being well-known in the art, the handle 970 will not be described in further detail.

FIG. 9A illustrates an alternative pivotable handle 184. Although not shown in FIG. 9A for clarity reasons, the handle 184 includes biased pins, similar to the biased pins 976. However, each of the pins is connected to a wire 186, instead of having a protrusion allowing the movement of the pin away from the grooves 972. The cables 186 are connected to two slidably movable members 188 and 190 slidably mounted within the handle 184. A biasing element in the form of a spring 192 biases the members 188 and 190 away from each other. The members 188 and 190 are configured and sized such that an intended user can move both members 188 and 190 toward each other, thereby moving the cables 186, and therefore the pins, away from the grooves 972. Then, the intended user can rotate the handle 184 on the frame 12.

Figure 9:
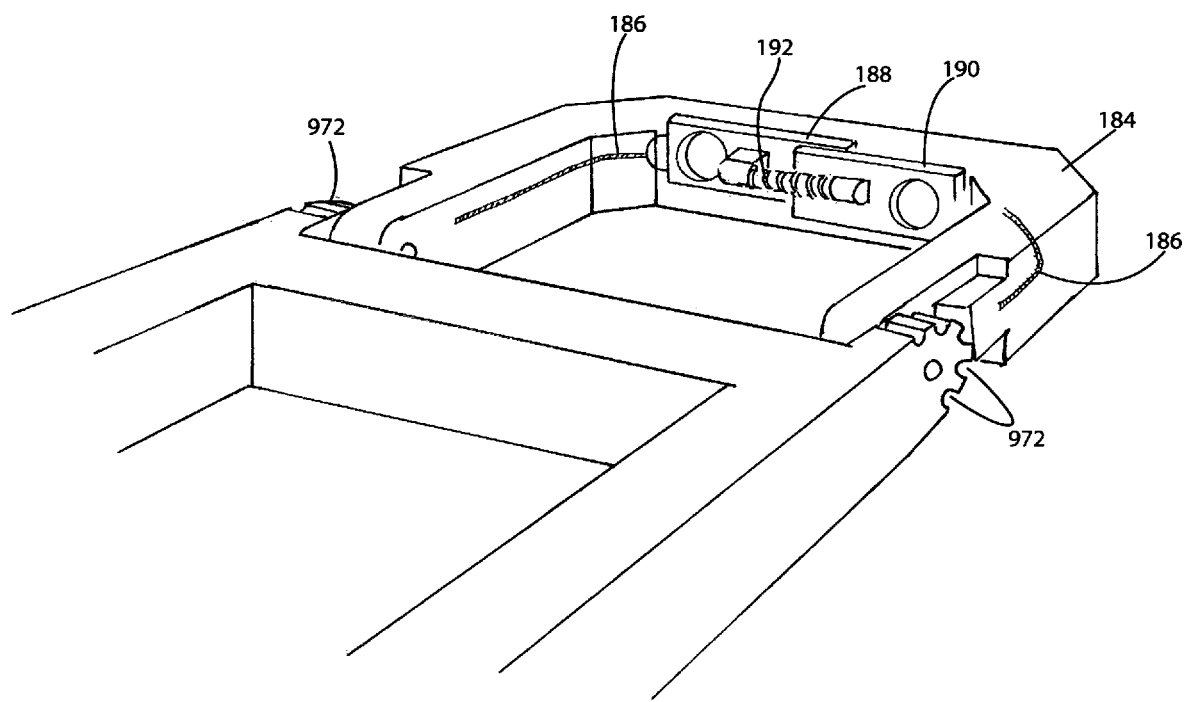
FIG. 9 is a perspective view of an alternative pivotable handle.
Figure 9B:
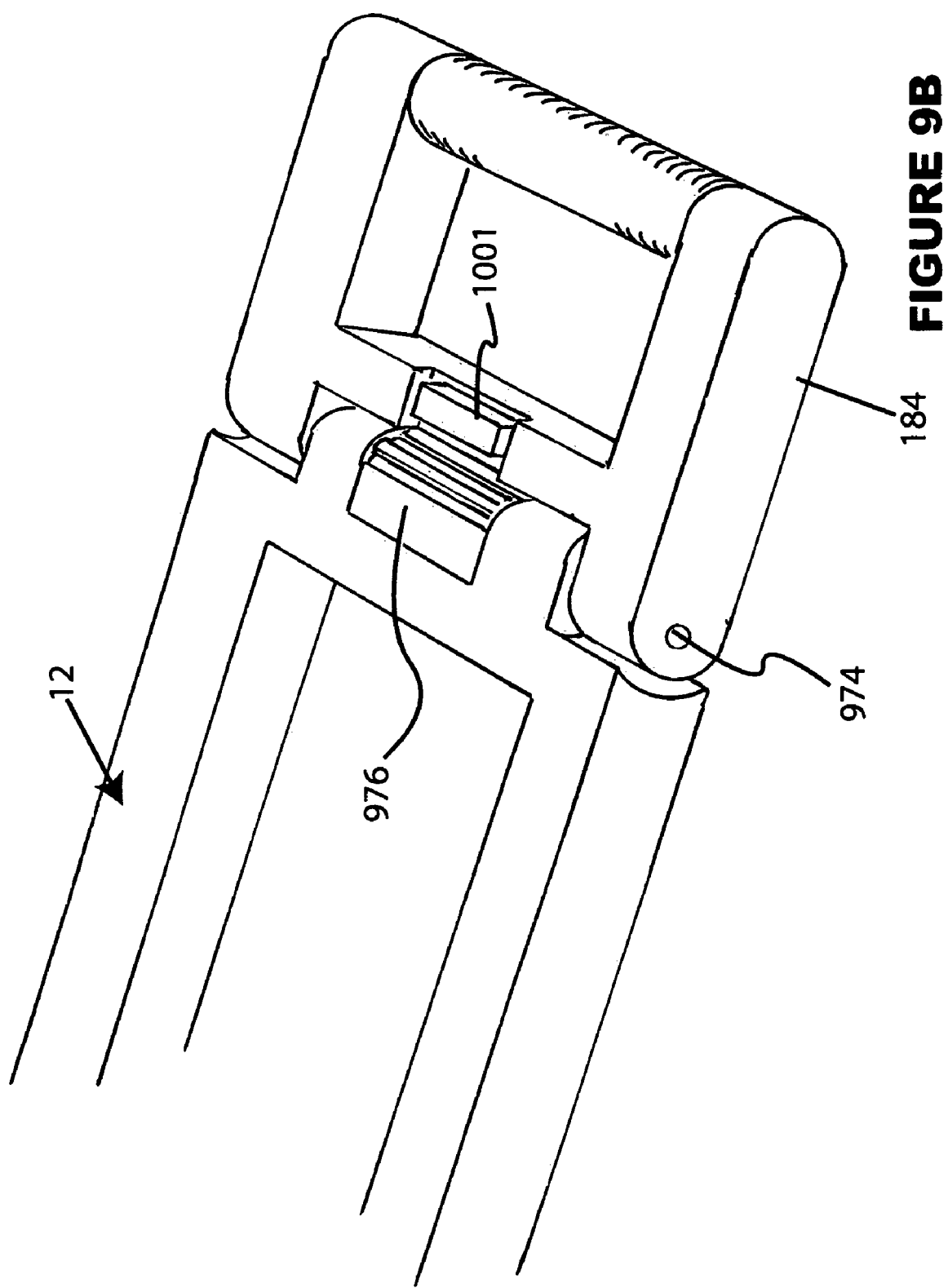
FIG. 9B illustrates another embodiment of the handle of the main frame.
Figure 9C:
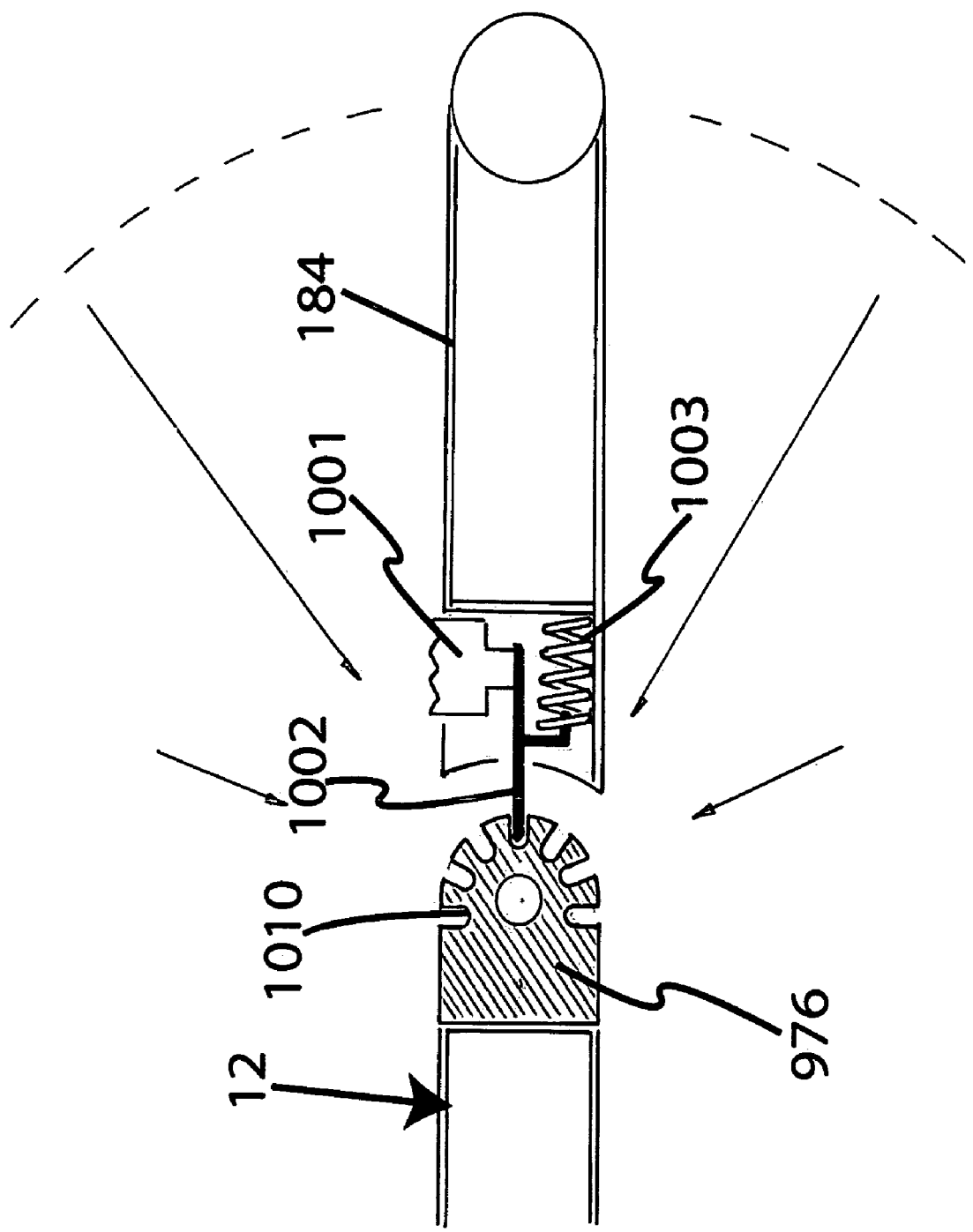
FIG. 9C illustrates another embodiment of the handle and how it is attached to the main frame.

FIGS. 9B and C shows another embodiment of the handles whereby the handle 184 is attached to a central protrusion at one end of the main frame 12. This embodiment allows the user to change the angle of the handle relative to the main frame with one finger and useable with one hand. The protrusion has a series of grooves 1010 and the handle has a sliding button 1001 for actuating a t-shaped plate 1002 to engage the grooves to determine the angle of the handle relative to the main frame. The plate 1002 is connected to a spring 1003. By allowing plate 1002 to slide into different grooves 1010, the angle of the handle relative to the main frame will change. The handle 184 can have an overlay 1002 added to it for anti-slip and comfort of user.

The reader skilled in the art will readily appreciate that many alternative pivotable handles are also within the scope of the invention.

As shown and mentioned hereinabove, the frame 12 is adapted to releasably attach a plurality of different accessories. One type of such accessories is a grater insert 100, 100' and 100". The grater inserts 100, 100' and 100" are of a conventional type and include a suitable grater design. As shown in FIG. 2, the grater insert 100 is a substantially flat grater insert including both elongated and substantially round grating holes 101 and 101'. The greater insert 100' is a substantially flat grater insert including substantially ellipsoidal grating holes 101". The grater insert 100" is a substantially convex grater insert including substantially ellipsoidal grating holes 101". Because of their conventional nature, the grater inserts 100, 100' and 100" will not be described in further detail.

Figure 10:
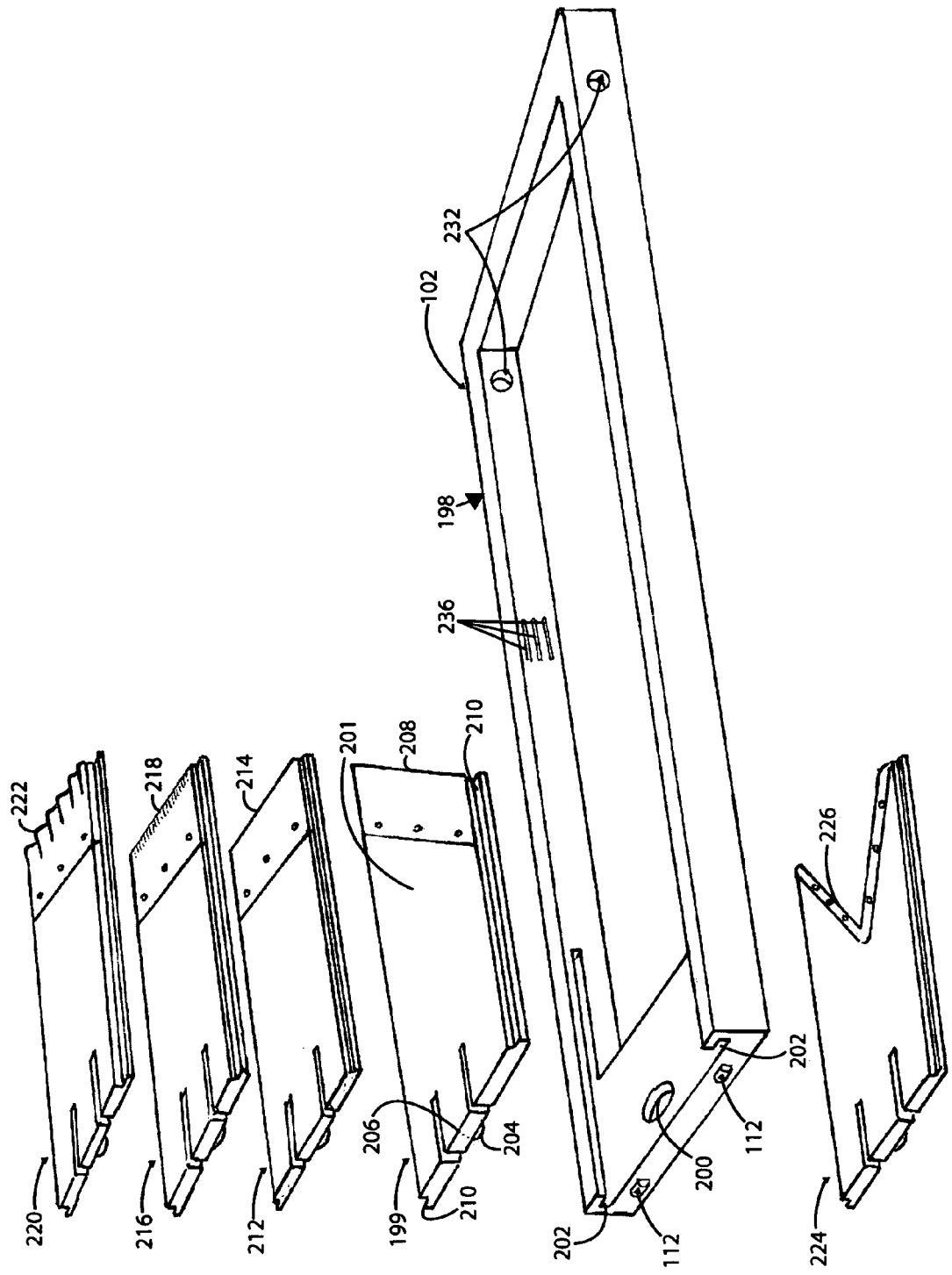
FIG. 10 illustrates a mandolin insert for the frame of FIG. 4A and a plurality of blade inserts for the mandolin insert.

As shown in FIGS. 10 and 11 in exploded view, the mandolin insert includes a mandolin frame 198 into which a plurality of blade inserts 199, 212, 216, 220 and 224 are insertable and lockable. The mandolin frame 198 includes the bumps 112 and the tongue 111 (not shown on FIGS. 10 and 11). In addition, a platform 228 is pivotably connected to the frame 198.

To receive and lock the blade inserts 199, 212, 216, 220 and 224, the mandolin frame 198 includes a recess 200, and a pair of rails 202. The blade insert 199 includes a body 201 onto which a pair of guides 210 is provided to engage the rails 202. In addition, the body 201 includes a tongue 206, flexibly connected to the body 201, onto which a protrusion 204 for engaging the recess 200 is provided. Also, a blade 208 is connected to the body 201. The blade 208 is angled with respect to a longitudinal axis of the body 201.

FIG. 10 shows many alternative blade inserts 212, 216, 220 and 224. Each of these blade inserts is similar in form and function to the blade insert 199, except that the blade 208 is replaced in each of these alternative blade inserts by an alternative blade. The blade insert 212 includes a blade 214 substantially perpendicular to a longitudinal axis of the blade insert 212. Similarly, the blade inserts 216 and 220 include respectively blades 218 and 222 having an edge substantially perpendicular to the longitudinal axis of the blade insert 216 and 220. The blade 218 is serrated, while the blade 222 includes a wave pattern. Also, the blade insert 224 includes a V-shaped blade 226. The advantages and functionality provided by the different blades mentioned hereinabove are well known in the art and will therefore not be described in further details.

Figure 11A:
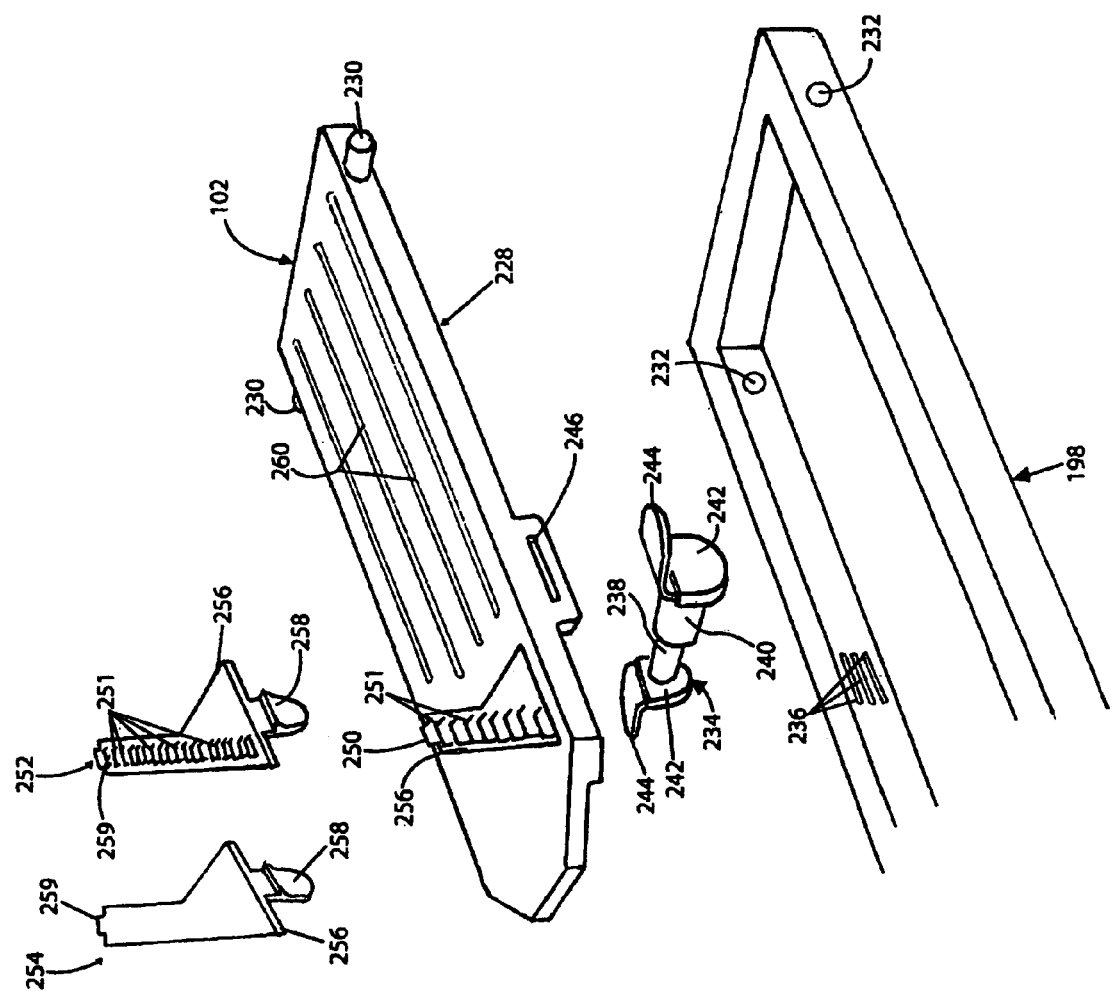
FIG. 11A illustrates, in an exploded view, a pivotable base of the mandolin insert of FIG. 10.

As shown in FIG. 11A, the platform 228 is pivotably attached to the mandolin frame 198 through axles 230 engaging bores 232 extending through the frame 198. In alternative embodiments of the invention, the bores 232 are replaced by recesses. The platform 228 is releasably lockable at the plurality of angles within the mandolin frame 198 through the engagement of a holding device 234 into notches 236 provided within the frame 198.

The hooking mechanism 234 includes a piston 238 entering a sleeve 240 wherein a biasing element, such as a spring, is provided (not shown in the drawings). The piston 238 and the sleeve 240 are each connected to a respective panel 242 substantially perpendicular to a longitudinal axis of the piston 238 and the sleeve 240. Each panel 242 is connected to respective a flange 244 substantially perpendicular to the panel 242. The flanges 244 extend through slits 246 provided in the platform 228 when the hooking mechanism 234 is attached to the mandolin frame 198 therefore engage the notches 236 to lock the platform 228 at different angles with respect to the frame 198.

Optionally, secondary blade inserts 250, 252 and 254 are releasably attached to the platform 228. Each of the secondary blade inserts 250, 252 and 254 includes a substantially flat panel 256 from which nothing, or a plurality of blades, extends. Each of the blades is substantially perpendicular to the panel 256. In the secondary blade insert 250, eight blades 251 extend from the panel 256. In the secondary blade insert 252, sixteen blades 251 extend from the panel 256. In the secondary blade insert 254, no blades extend from the panel 256. However, secondary blade inserts having any number of blades 251 are within the scope of the invention.

Each of the blade inserts 250, 252 and 254 is releasably attached to the platform 228 using any suitable way known in the art. For example, in a specific embodiment, each of the blade inserts 250, 252 and 254 includes a flexible latch 258 for engaging the platform 228 (only one of which is shown on FIG. 11) and a pin 259 receivable within a recess (not shown in the drawings) in the platform 228.

In a specific embodiment of the invention, a plurality of ridges 260 are provided on the platform 228, each having a longitudinal axis substantially parallel to a longitudinal axis of the platform 228. Among other functions, the ridges 260 reduce friction between the platform 228 and the food and help to guide food towards the primary blade inserts.

Figure 11B:
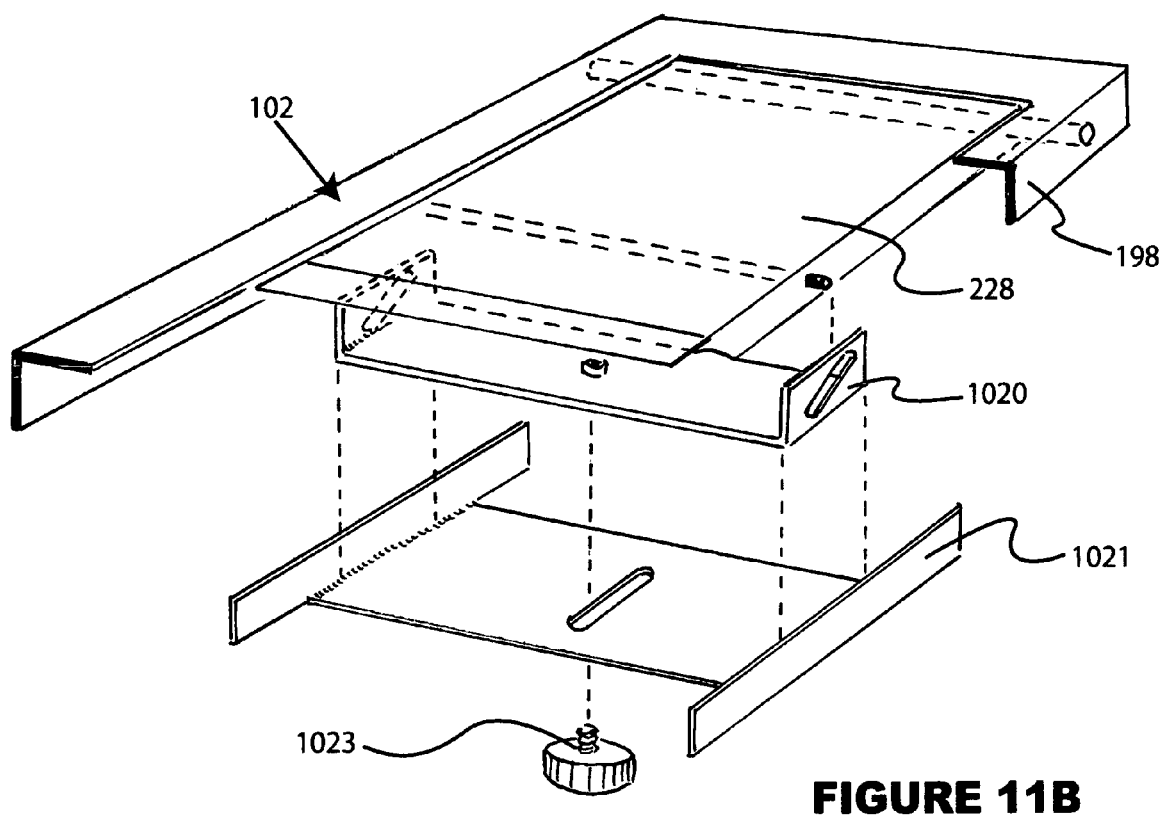
FIG. 11B illustrates the sliding plate mechanism of the mandolin.

FIG. 11B shows another embodiment of the invention whereby the inserted implement 102 is provided with different angles and slopes relative to the implement frame 198. Sliding plates, 1020 and 1021 respectively, are situated below the frame 198. The plate 1020 is connected to 228 and 1021 is connected to 198. 1023 moves through 1021 by the slot in 1021. The plate 1020 is connected to a screw 1023 and by loosed the screw 1023, the user can change the angle of the implement 102.

Figure 11C:
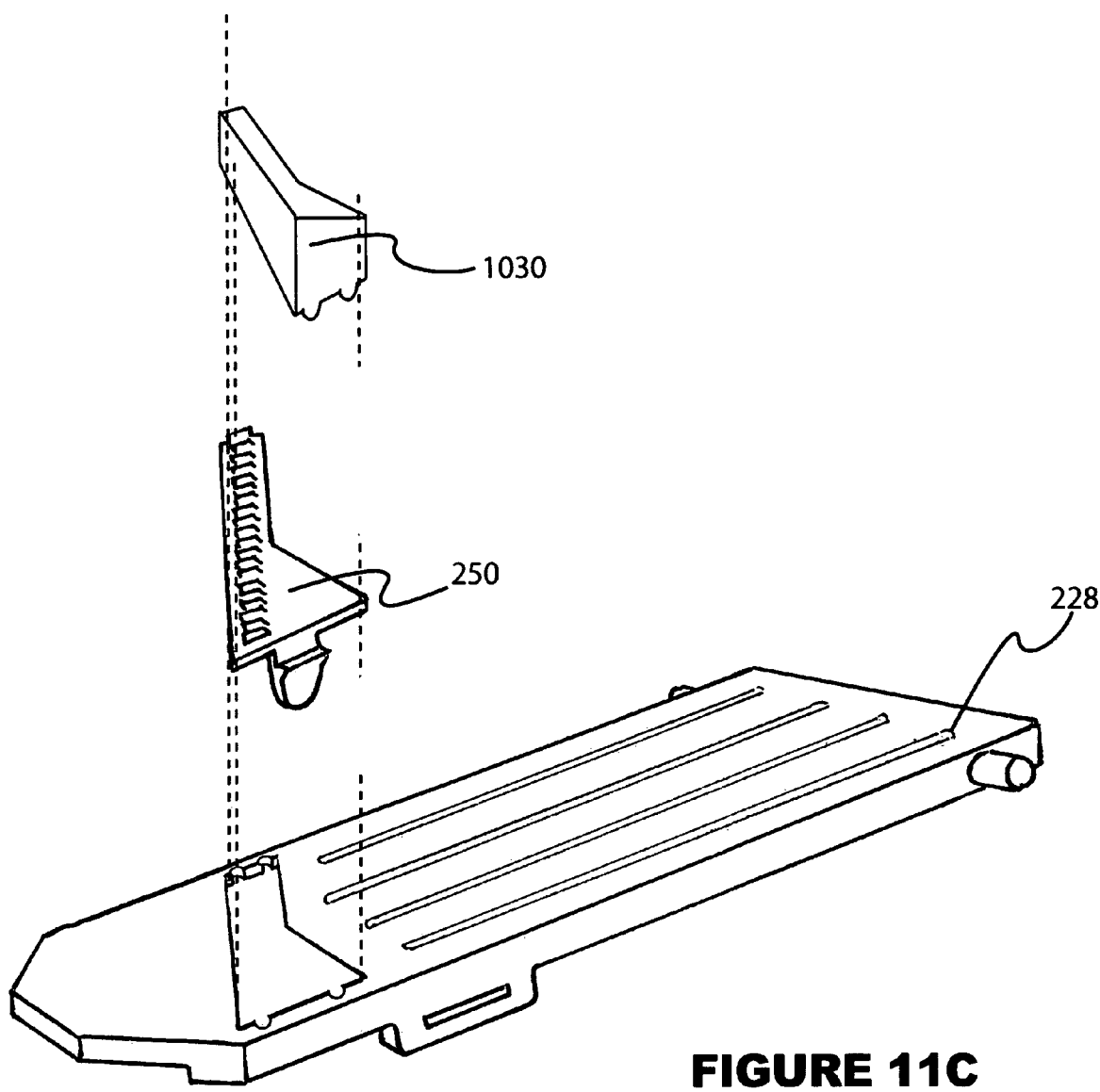
FIG. 11C illustrates the attachment of blades to the insertable implement.

FIG. 11C illustrates the platform 228 whereby a blade 250 is covered by a plate or blade cover 1030. The blade cover 1030 can be attached blade 250 while the blade is still inserted in platform 228.

Figure 11D:
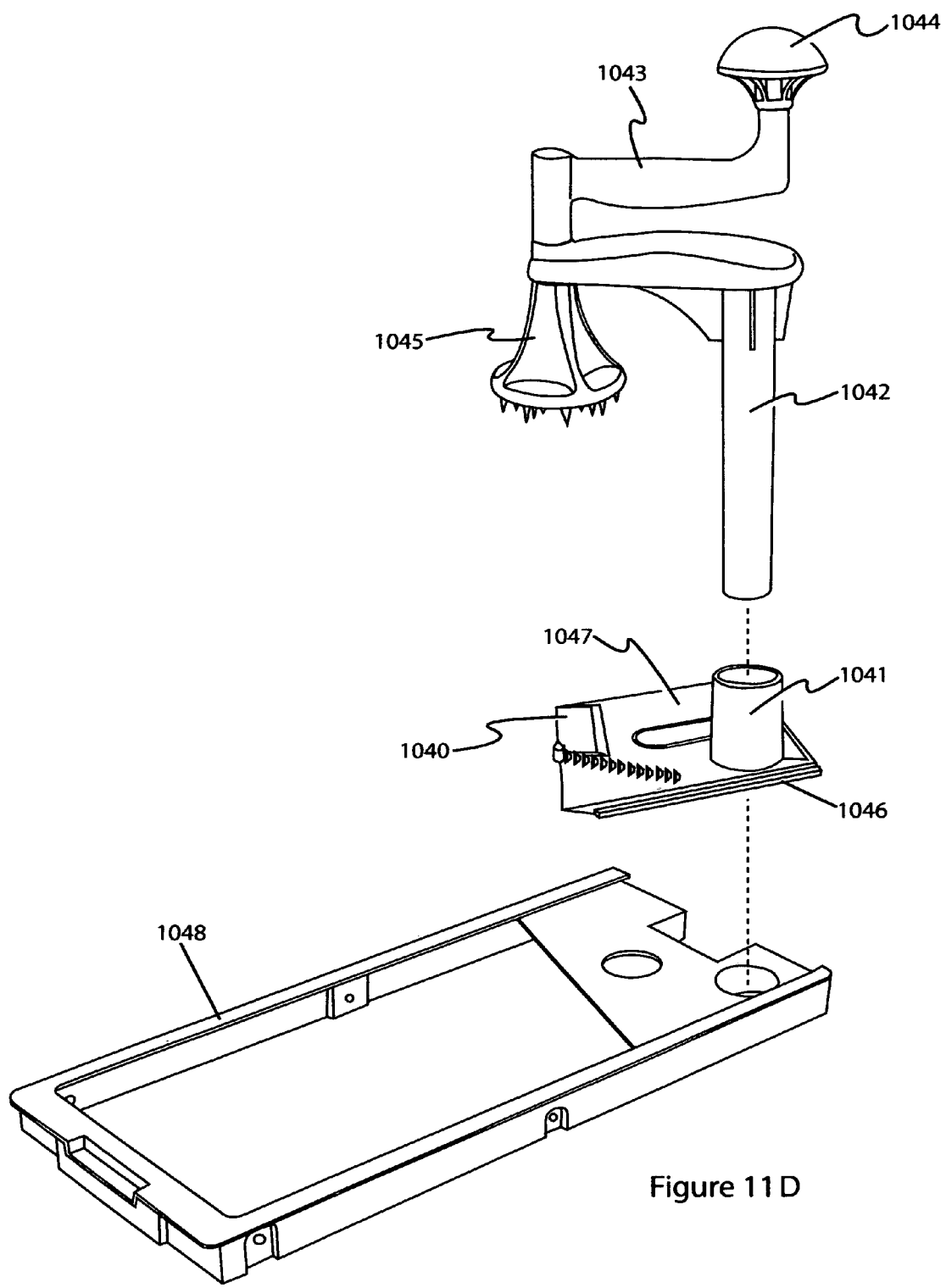
FIG. 11D illustrates the peeler mechanism of the present invention.

FIG. 11D shows the rotating cutter embodiment of the invention which is attached to a mandolin insert 1048. The mandolin insert 1048 has a supporting base 1046 (this base is a modification of FIG. 10) with an aperture 1047. The rotating cutter also comprises a blade 1040 which has a hollow cylinder 1041; and handle 1043 attached to a post 1042 on one end and a knob 1044 on the other end; the handle 1043 with the knob 1044 is designed to rotate the spiked food holder 1045. The post 1042 is the designed to fit through the hollow cylinder 1041 of the blade 1040 and the aperture 1047 of the base 1046 of the mandolin insert 1048 during use.

Figure 12:
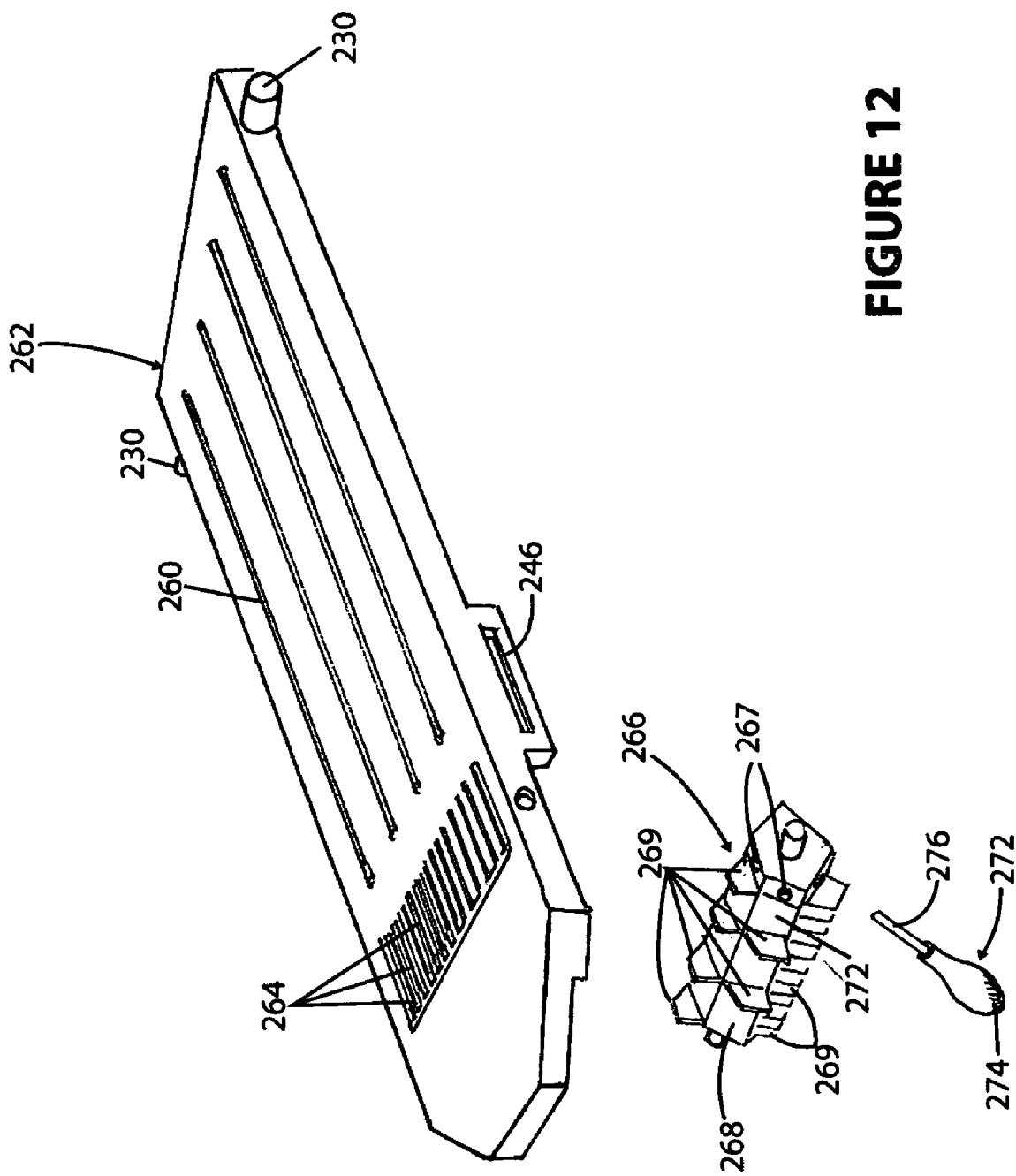
FIG. 12 illustrates an exploded view of an alternative pivotable base.

FIG. 12 is an exploded view of an alternative platform 262. The alternative platform 262 is similar to the platform 228, except that the platform 262 does not include secondary blade inserts. Instead, the platform 262 includes a plurality of tongues 264 flexibly connected to the platform 262. A turret 266 is pivotably mounted to the platform 262 in proximity to the tongues 264. Specifically, the tongues 264 allow a rotation of the turret 266 upon the exertion of force by a user.

The turret 266 is generally polygonal, and specifically, as shown in FIG. 12, the turret 266 includes five sides. However, the reader skilled in the art will readily appreciate that a turret with any other suitable number of sides is within the scope of the invention. Each side of the turret is provided with a number of blades 269. For example, the turret 266 includes a side (not shown in the drawings) having no blade, a side 268 having two blades 269, a side 270 having four blades 269, a side 272 having eight blades 269 and a side having sixteen blades (not shown in the drawings).

The blades include at least one sharp edge and extend outwardly from the turret 266 and are substantially perpendicular to each surface of the turret 266. The blades 269 are provided such that when the turret 266 is rotated, the blades enter spaces left between the tongues 264.

The turret 266 includes a plurality of bores 267 into which a turning tool 272, having a handle 274 and an elongated member 276, is inserted to allow a user to rotate the turret 266.

In some embodiments of the invention, the platforms 228 and 262 are permanently connected to the frame 198. However, in alternative embodiments of the invention not shown in the drawings, the platforms 228 and 262 are detachably connected to the frame 198.

In use, an intended user wishing to use the mandolin insert 102 inserts one of the blade inserts 199, 212, 216, 220 and 224 into the mandolin insert 102. In addition, the user either inserts one of the secondary blade inserts 250, 252 or 254, or alternatively rotates the turret 266 such that a desired number of blades extend from the platform 228 or 262. The user also presses the panels 242 toward each other to allow an adjustment the angle between the platform 228 or 262 and the frame 198. An adjustment of this angle allows the user to select a thickness of slices of food to be cut by the mandolin insert 102.

If desired, the mandolin insert 102 is inserted into the frame 12 by first engaging the bumps 112 into the recesses 108 and then by pressing the tongue 111 into the notch 110. To remove the mandolin insert from the frame 12, the tongue 111 is flexed outwardly from the notch 110, thereby allowing the user to remove the extremity of the insert 102 including the tongue 111 from the frame 12.

To cut food, the user simply pushed the food along the surface of the platform 228 or 262, starting from an extremity distal from the blade insert and towards the blade. If the secondary blade insert, or a position of the turret 266 wherein secondary blades are present is selected, the food is first cut in a direction perpendicular to a direction of motion when the food is pushed toward the primary blade insert. Shortly afterwards, the food that has just been cut by the secondary blade is cut into a slice by the primary blade. Accordingly, a user can cut slices or sticks of food, depending on the choice of secondary and primary blades.

Figure 13A:
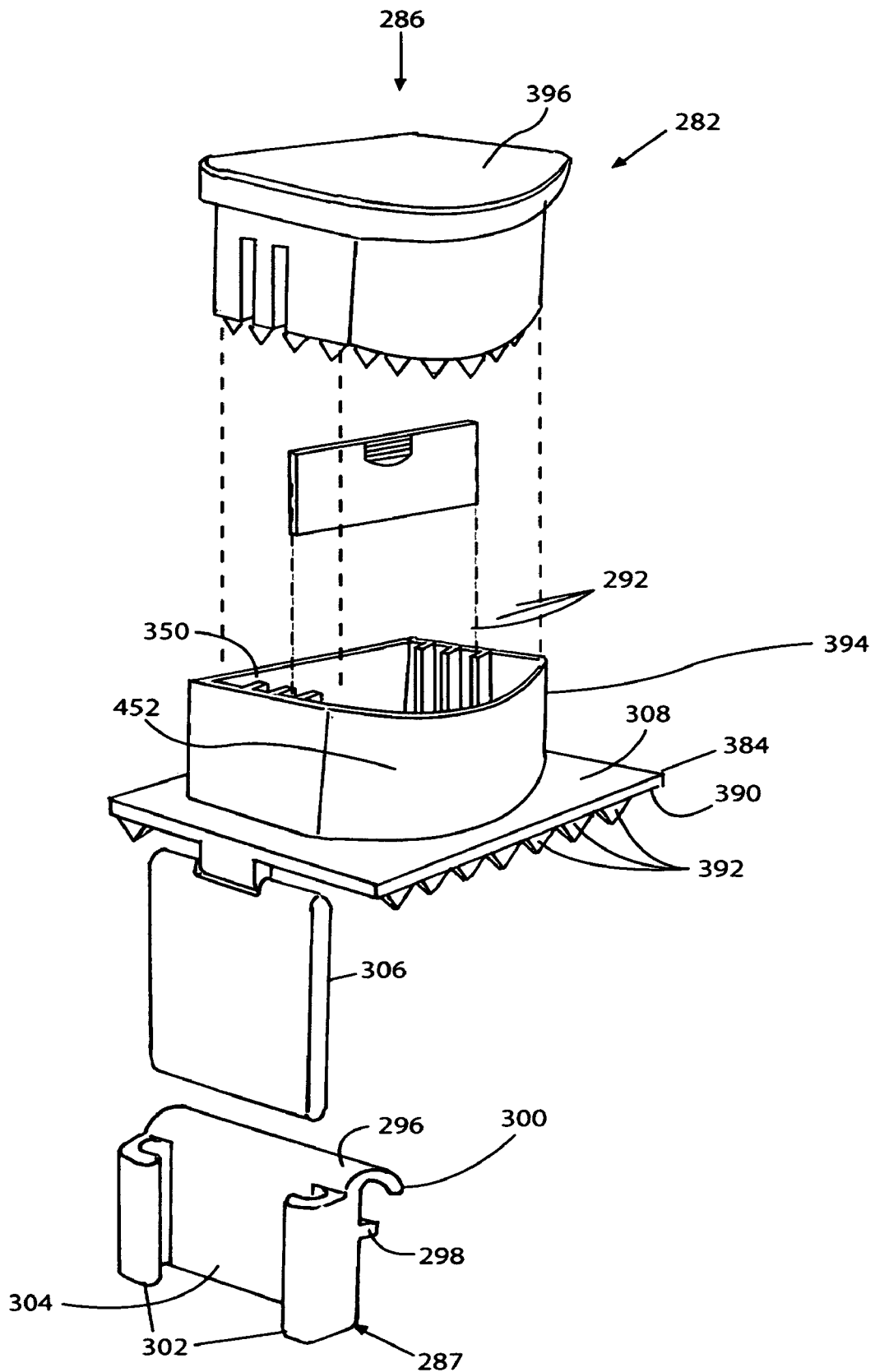
FIG. 13A illustrates a slider for holding food slidably mountable to the frame of FIG. 4A.

FIG. 13A shows an exploded view of a slider 286 provided in some embodiments of the invention and slidably and removably attachable to the frame 12 to allow the user to slide food on the platform 228 or 262 of the mandolin insert 102, or on the greater inserts 100, 100' and 100" with a reduced risk of cuts caused by blades touching fingers, or other parts of the body. The slider 286 includes an attachment 287 for engaging guides 114 and 115 provided in the frame 12 (as shown in FIG. 4A). The guide 115 includes an open end 292 while the guide 114 includes a closed end 294. Therefore, the slider 286 is hardly detachable from the frame 12 by accident. However, the general shape of the attachment 287, which will be described in further detail below, is such that if required, a user can detach the attachment 287 from the frame 12.

The attachment 287 includes an attachment portion 296 having a substantially F-shaped profile. This F-shaped profile defines a substantially elongated ridge 298 for engaging the guide 115, and a substantially curved ridge 300 for engaging the guide 114. In addition, the attachment 287 includes two substantially curved members 302 curving towards each other and defining a receiving portion 304 for receiving a substantially flat panel 306 described in further detail hereinbelow.

The flat panel 306 is pivotably connected to a base 384 defining first and second surfaces 308 and 390. A plurality of points 392 extend substantially away from the second surface 390. A tubular member 394 extends from the first surface 308. The base 384 includes a passageway shaped similarly to the tubular member 394 (not visible on FIG. 13).

A pusher 282 generally shaped like the tubular member 394 is slidably insertable within the tubular member 394. The pusher 282 includes a pushing surface 396 for allowing the hand of a user to push food through the tubular member 394, and a plurality of points 292 provided on a surface opposite the pushing 396.

The tubular member 394, along with the pusher 396, has a substantially rectangular shape with one side having a substantially curved shape. This specialized shape allows a user to maintain a great variety of food securely within the tubular member 394. For example, substantially square pieces of food are more easily maintained by a flat wall 350 of the tubular member 394. In contrast, other pieces of food, such as potatoes and the like, are more easily maintained through a substantially curved surface 452.

In use, the attachment 287 is attached to the frame 12 through a deflection of the ridge 300 when entering the guiding rails 114 and 115. Then, the attachment 287 is slidably attached to the frame 12 and cannot easily be detached accidental from the frame 12. Then, the panel 306 is inserted into the receiving portion 304. Food is provided either in contact with the points 392 provided on the second surface 310, or provided within the tubular member 394 and pushed by the user with the pusher 396. Then, the user can easily slide the food over the accessory so as to grate or cut the food with a relatively low risk of injury.

The panel 306 easily slides within the receiving portion 304 and the base 384 easily pivots with respect to the panel 306. These 2 degrees of freedom allow a user to use the attachment 287 to slide a great variety of food having different dimensions and texture.

In addition, the attachment 287 allows to easily detach the tubular member 394 and the pusher 396 from the attachment 287, and therefore from the frame 12, by sliding the panel 306 out of the receiving portion 304. This facilitates positioning of food on the accessory prior to processing.

Figure 13B:
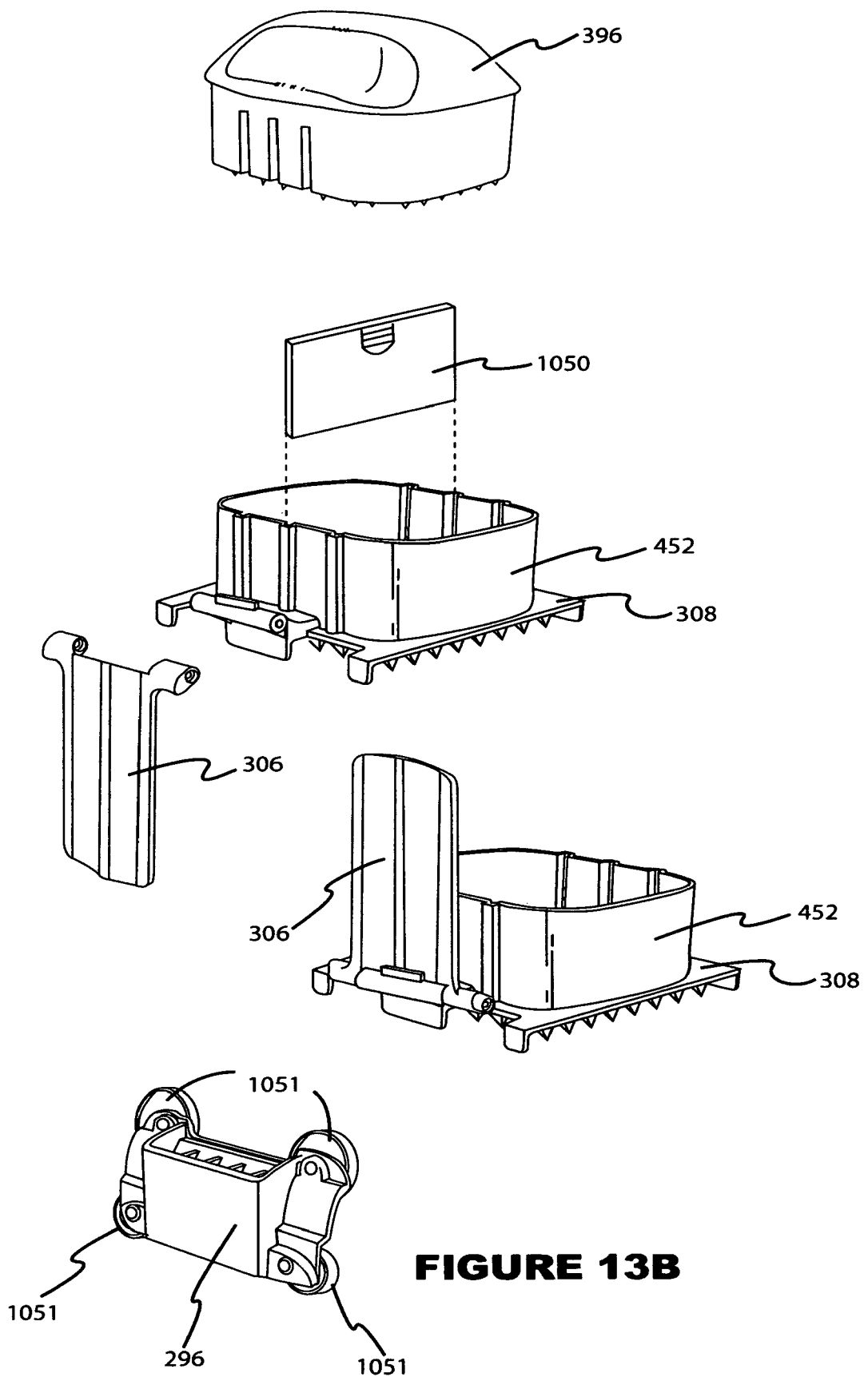
FIG. 13B illustrates another embodiment of the slider.
Figure 13C:
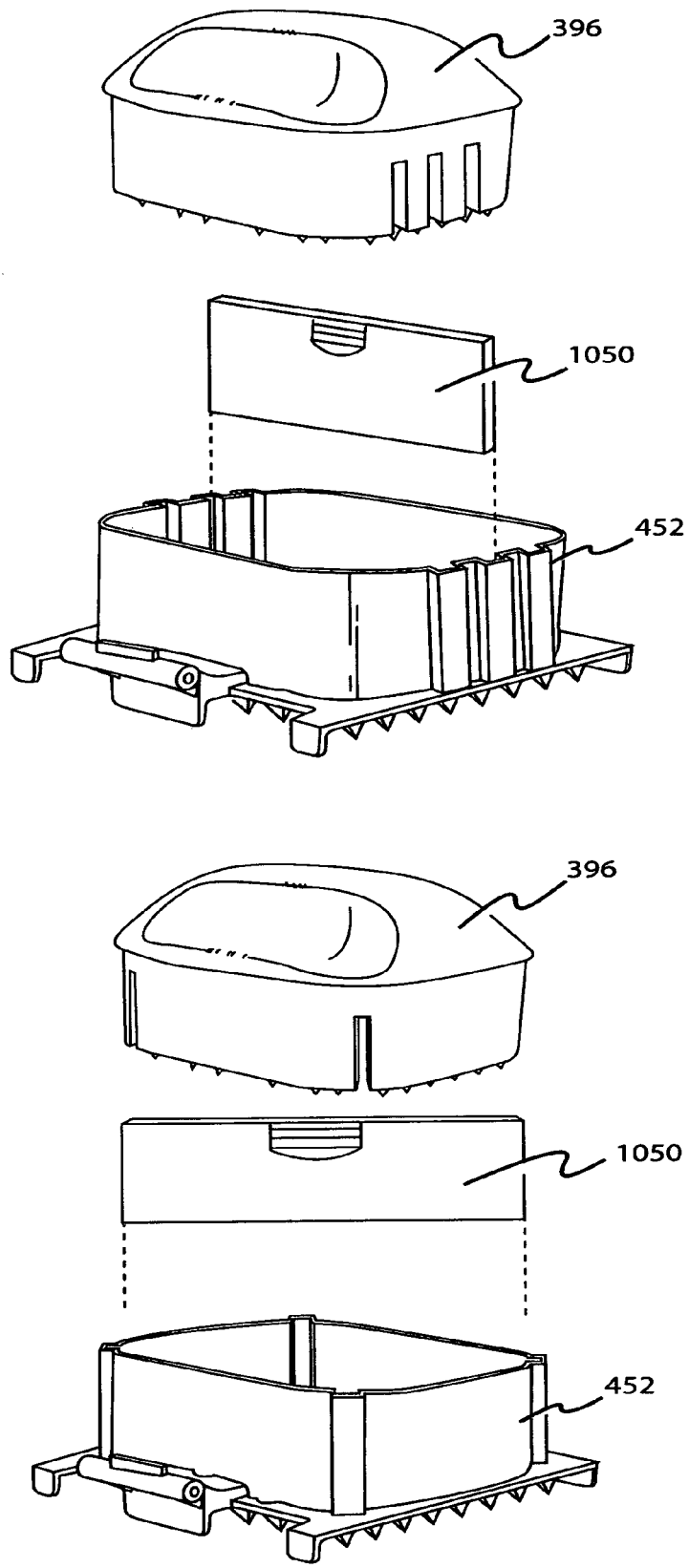
FIGS. 13C-D illustrate the insertable wall of the slider.
Figure 13D:
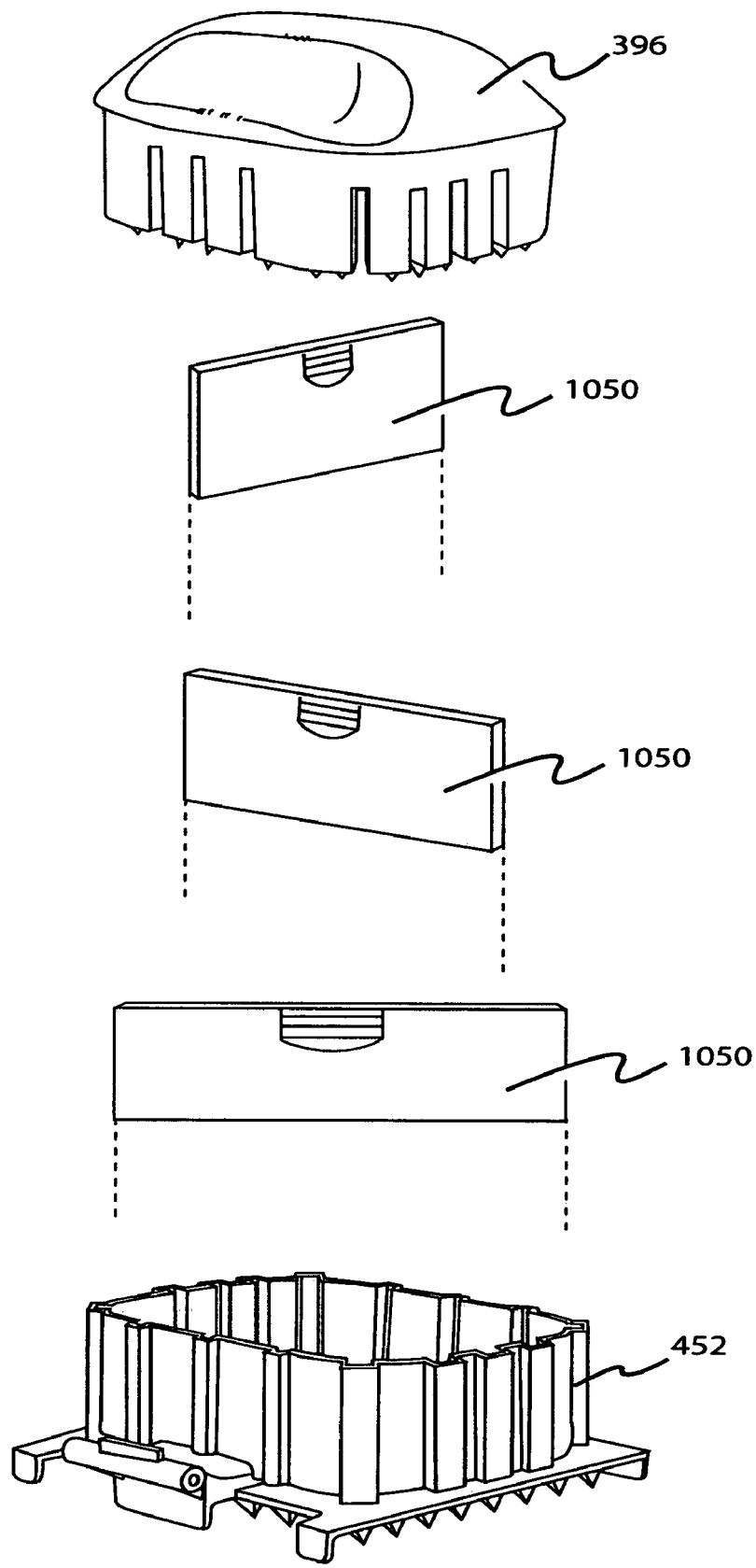

FIGS. 13B-D shows another embodiment of the slider 286 which comprises of the pusher 396 and the pusher base 308 with the vertical panel 306 and the attachment 296. In this embodiment, the attachment 296 comprises a plurality of wheels 1051 which provides for the runner system. In addition, there is insertable and detachable wall 1050 which fits in the internal cavity of the pusher base 308. There are aligning slots in the pusher 396 which are used when the insertable vertical wall 1050 is placed within the internal cavity of the plunger body 452.

Figure 14:
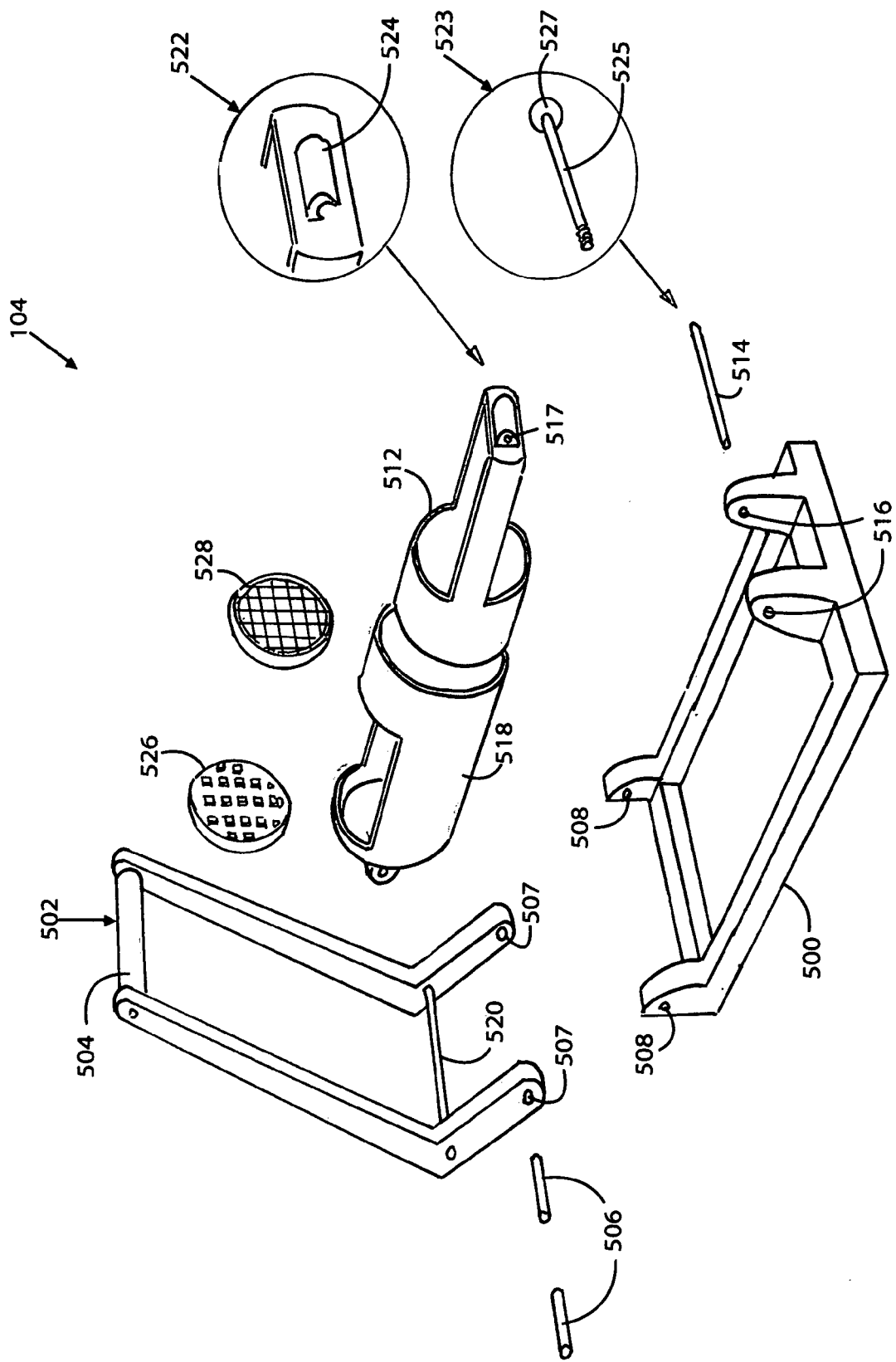
FIG. 14 illustrates, in an exploded view, a piston operated food processing device.

FIG. 14 illustrates, in an exploded view, the piston operated food processing device insert 104. The reader skilled in the art will readily appreciate that a similar piston operated food processing device could be used as a stand-alone item without the requirement of being an insert for a base. The insert 104 includes a base 500 to which a lever 502, including a handle 504, is rotatably attached through two axles 506 inserted into the lever 502, through holes 507, and through mounting holes 508 provided on the base 500.

A piston 512 is mounted on an axle 514 such as to be rotatably connected to the base 500. The axle 514 is either permanently inserted into mounting holes 516 provided in the base 500 and a mounting hole 517 provided in the piston 512, or alternatively, the axle 514 is removable from the mounting holes 516 and 517.

In some embodiments of the invention the axle 514 takes the form of a magnetic pin 525 (see insert 523). In these embodiments, the magnetic pin 525 includes a magnetic and substantially flat head 527 and the base 500 includes a magnet for attracting the head 527. Therefore, the magnetic pin is removably attachable to the base 500.

Forces directed along a longitudinal axis of the magnetic pin 525 are typically small. Therefore, there is only a small risk that the magnetic pin 525 will become detached from the base 500 in normal use of the insert 104. However, the magnetic pin 525 is removable from the base 500 without causing damages to the insert 104.

In other embodiments of the invention (not shown in the drawings), an axle includes threads engaging a corresponding threaded bore within the base 500, thereby allowing to removably attach this axle to the base 500. In yet other embodiments of the invention, the piston 512 (shown in insert 522) includes an attachment clip 524 provided thereon. The attachment clip 524 allows to releasably attach the piston 512 to the axle 514.

The piston 512 enters a sleeve 518 attached to the lever 502 through an axle 520. The sleeve 518 attaches to the lever 502 similarly to the way in which the piston 512 attaches to the frame 500. A pair of inserts 526 and 528 are respectively removably insertable into the sleeve 518 and the piston 512.

Figure 15:
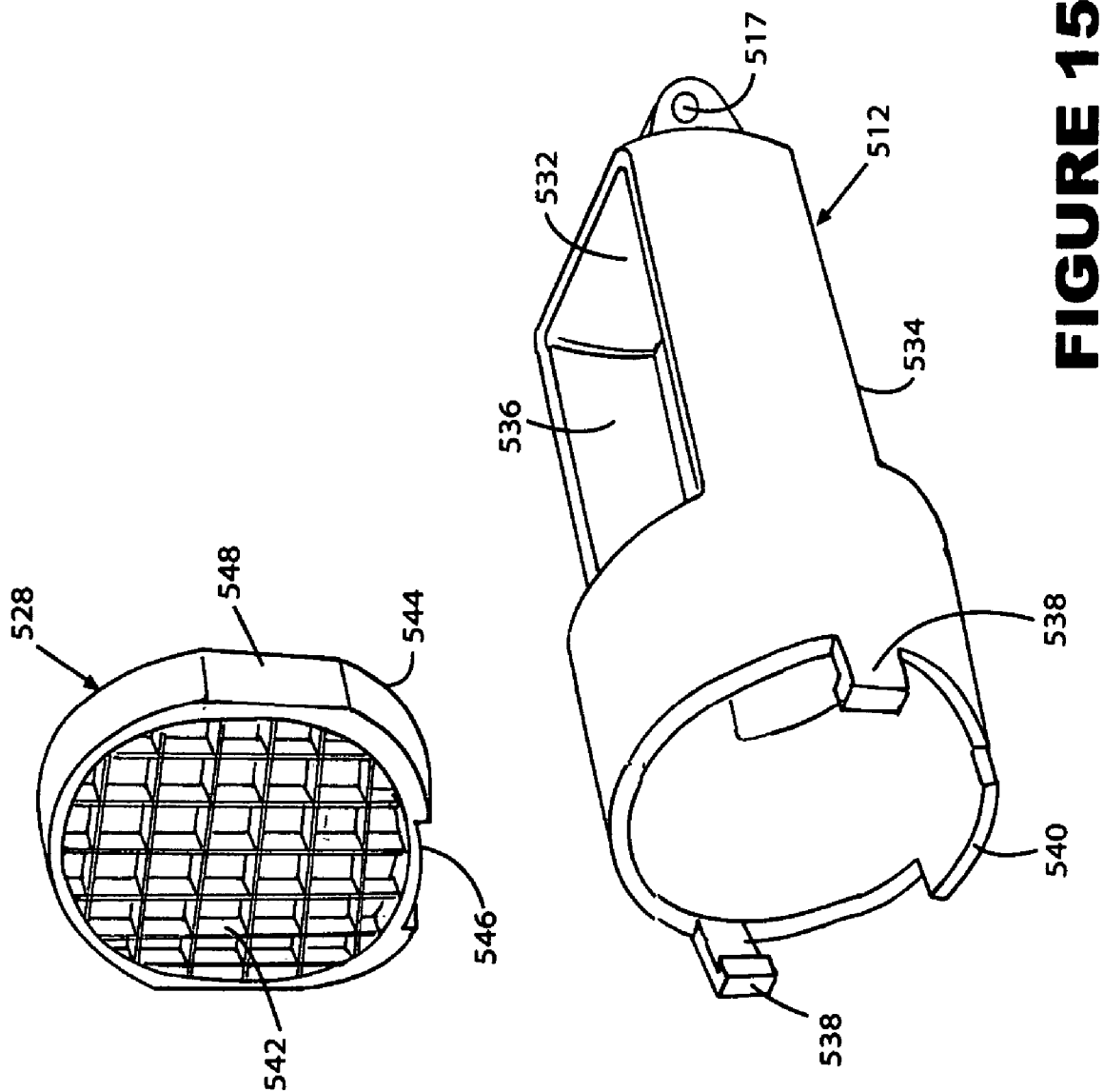
FIG. 15 in a perspective view of a piston of the piston operated food processing device of FIG. 14 along with an insert.

The piston 512 is shown in more details on FIG. 15. The piston 512 includes first and second openings 532 and 534 defining a passage-way 536 through the piston 512 and two clips 538 along with the flange 540 for receiving and frictionally engaging the insert 528. The insert 528 includes a gridlike blade 542 supported within a frame 544, including a depression 546 for engaging the flange 540, and two substantially flat portions 548 (only one of which is shown in FIG. 15) for engaging the clips 538.

Figure 16:
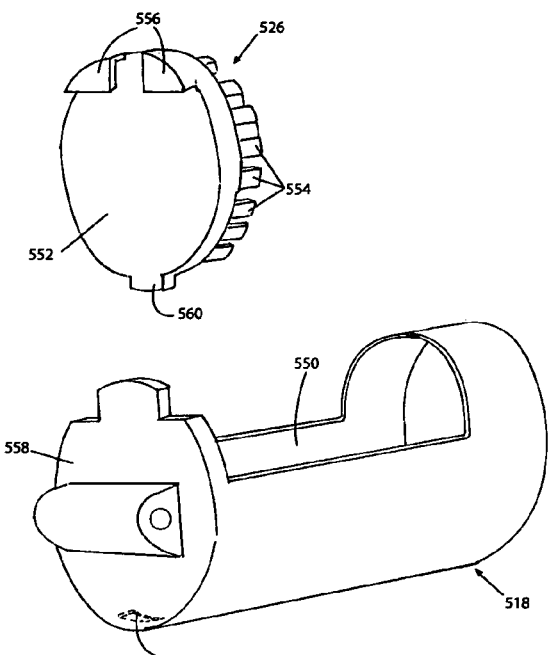
FIG. 16 is a perspective view of a sleeve of the piston operated food processing device of FIG. 14 along with an insert.

The sleeve 518 is shown in detail on FIG. 16. The sleeve 518 receives the piston 512. The sleeve 518 includes an opening 550 provided to match at least partially the opening 532 of the piston 512 when the piston 512 is inserted completely within the sleeve 518.

The insert 526 includes a substantially flat panels 552 from which a plurality of protrusions 554 extend. In addition, the insert 526 includes two attachment clips 556 for engaging an end wall 558 of the sleeve 518. The insert 526 also includes a flange 560 for engaging a bore 564 provided in the sleeve 518.

Figure 17A:
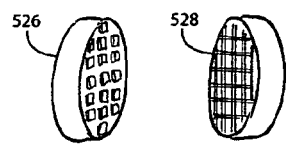
FIG. 17A illustrates two matching inserts for the piston operated food processing device of FIG. 14.

As shown in FIG. 17A to 17E, a plurality of combinations of inserts are usable in conjunction with the invention. FIG. 17A shows the pair of inserts 526 and 528. These inserts have been described hereinabove with respect to the description of FIGS. 15 and 16. The inserts shown in FIG. 17A are usable, among other uses, to cut potatoes.

Figure 17B:
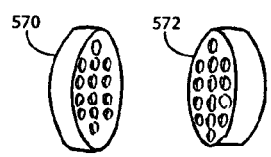
FIG. 17B illustrates two alternative matching inserts for the piston operated food processing device of FIG. 14.

FIG. 17B shows two alternative inserts 570 and 572 respectively insertable into the sleeve 518 and the piston 512. The insert 570 includes a plurality of substantially circular protrusions matching corresponding substantially circular bores provided into the insert 572. Among other uses, the insert 570 and 572 are useful for ricing potatoes.

Figure 17C:
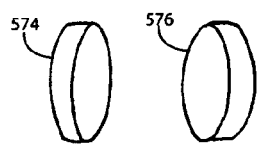
FIG. 17C illustrates another two alternative matching inserts for the piston operated food processing device of FIG. 14.

Inserts 574 and 576, shown on FIG. 17C and insertable respectively into the sleeve 518 and the piston 512, each present a flat and continuous surface. One possible use for insert 574 and 576 is for crushing nuts.

Figure 17D:
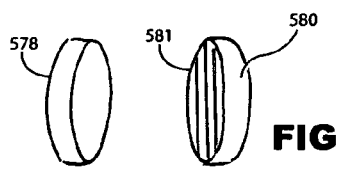
FIG. 17D illustrates yet another two alternative matching inserts for the piston operated food processing device of FIG. 14.

As shown on FIG. 17D, insert 578 is similar to insert 574 and insert 580 includes a plurality of substantially parallel blades 581 provided within a frame. Insert 580 is insertable into piston 512, while insert 578 is insertable into the sleeve

518. The inserts 578 and 580 are suitable for many applications, including, among others, slicing eggs.

Figure 17E:
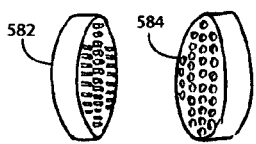
FIG. 17E illustrates yet another two alternative matching inserts for the piston operated food processing device of FIG. 14.

Inserts 582 and 584, shown on FIG. 17E, are insertable respectively into the sleeve 518 and the piston 512. The insert 582 includes a plurality of substantially circular protrusions matching corresponding substantially circular bores provided into the insert 584. The protrusions and bores are sized such that inserts 582 and 584 are suitable for pressing garlic, among other uses.

In some embodiments of the invention, the parts of the insert 104 are attached together through screws or hook-like attachments incorporated into the structure of the insert 104 in ways that are well known in the art.

The operation of insert 104 will now be described in relation with FIGS. 18A, 18B, 18C, 19A, 19B and 19C. In these Figures, Figures designated by a number followed by the same letter are different views of the insert 104 at the same stage of operation. Specifically, FIGS. 18A to 18C are perspective views corresponding to top views in FIGS. 19A to 19C.

Figure 18A:
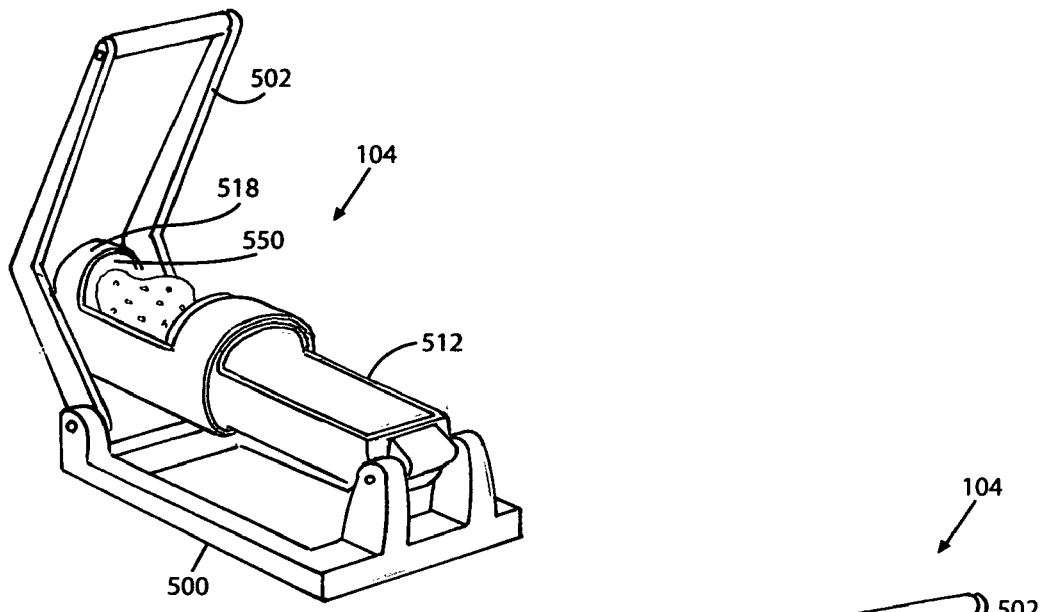
FIG. 18A illustrates the piston operated food processing device of FIG. 14 with the piston is partially engaged within the sleeve.
Figure 18B:
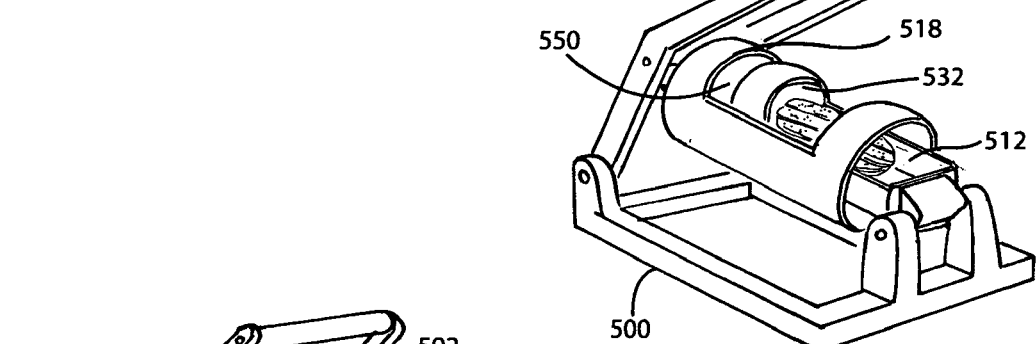
FIG. 18B illustrates the food processing device of FIG. 14 with the piston completely engaged within the sleeve.
Figure 18C:
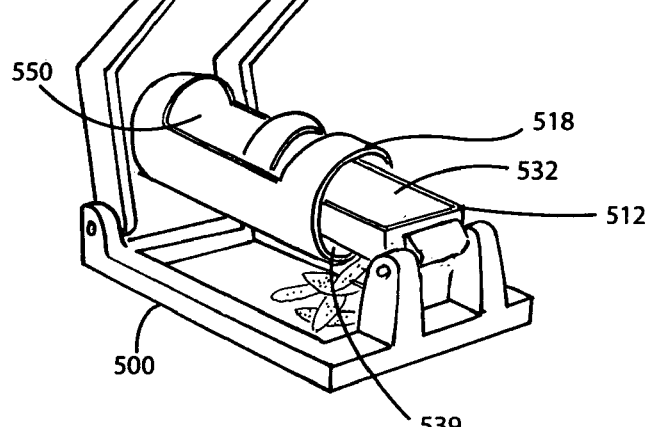
FIG. 18C illustrates the food processing device of FIG. 14 with the piston removed from the sleeve.
Figure 19A:
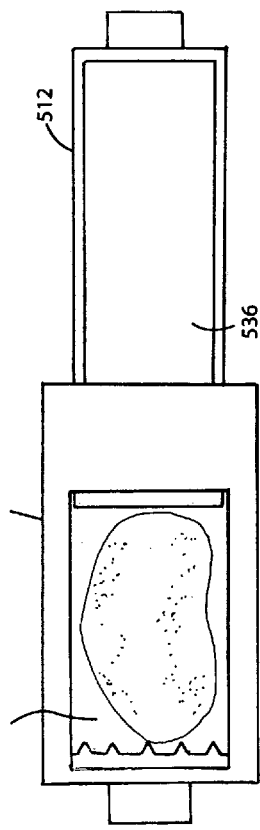
FIG. 19A is a top view of the piston and sleeve of the food processing device of FIG. 14 in the configuration shown in FIG. 18A.
Figure 19B:
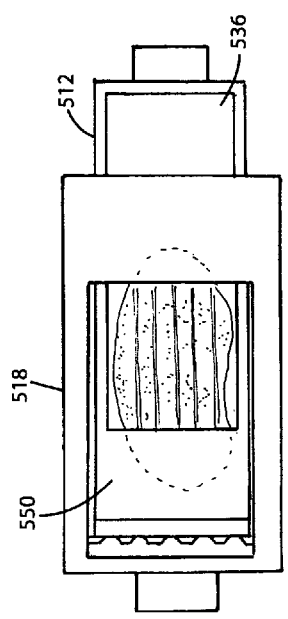
FIG. 19B is a top view of the piston and sleeve of the food processing device of FIG. 14 in the configuration shown in FIG. 18B.
Figure 19C:
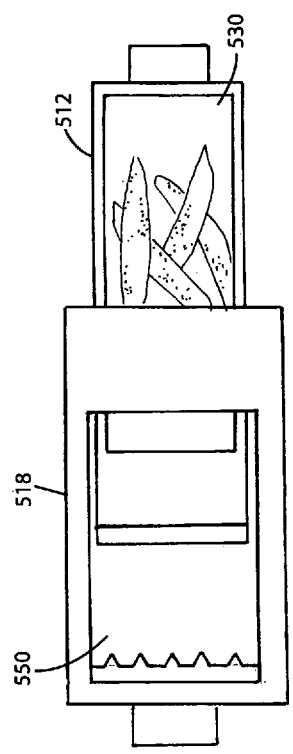
FIG. 19C is a top view of the piston and sleeve of the food processing device of FIG. 14 in the configuration shown in FIG. 18C.

As shown in FIG. 18A, at first the food, such as a potato, for example, is inserted into the sleeve 518 through the opening 550. Then, the lever 502 is operated to move the piston 512 into the sleeve 518. As shown in FIG. 18B, when the piston 512 is substantially totally inserted into the sleeve 518, a user can pick up food which has been cut by the insert 528 through the openings 550 and 532. As the opening 534 is blocked by the sleeve 518, the food stays within the sleeve 518.

Subsequently, if the food is left within the piston 512 the user operates the handle 502 to retract the piston 512 from the sleeve 518. Then, food is no longer supported by the sleeve 518 and can fall through the opening 534. In this case, it can be advantageous, but not necessary, to have a receptacle positioned under the insert 104 to collect the food falling therethrough.

All parts described hereinabove include any suitable material, such as polymers, among others. Blades include a sharp edge preferably formed with a metallic material. However, it is within the scope of the invention to have blades, including alternative materials.

Figure 20:
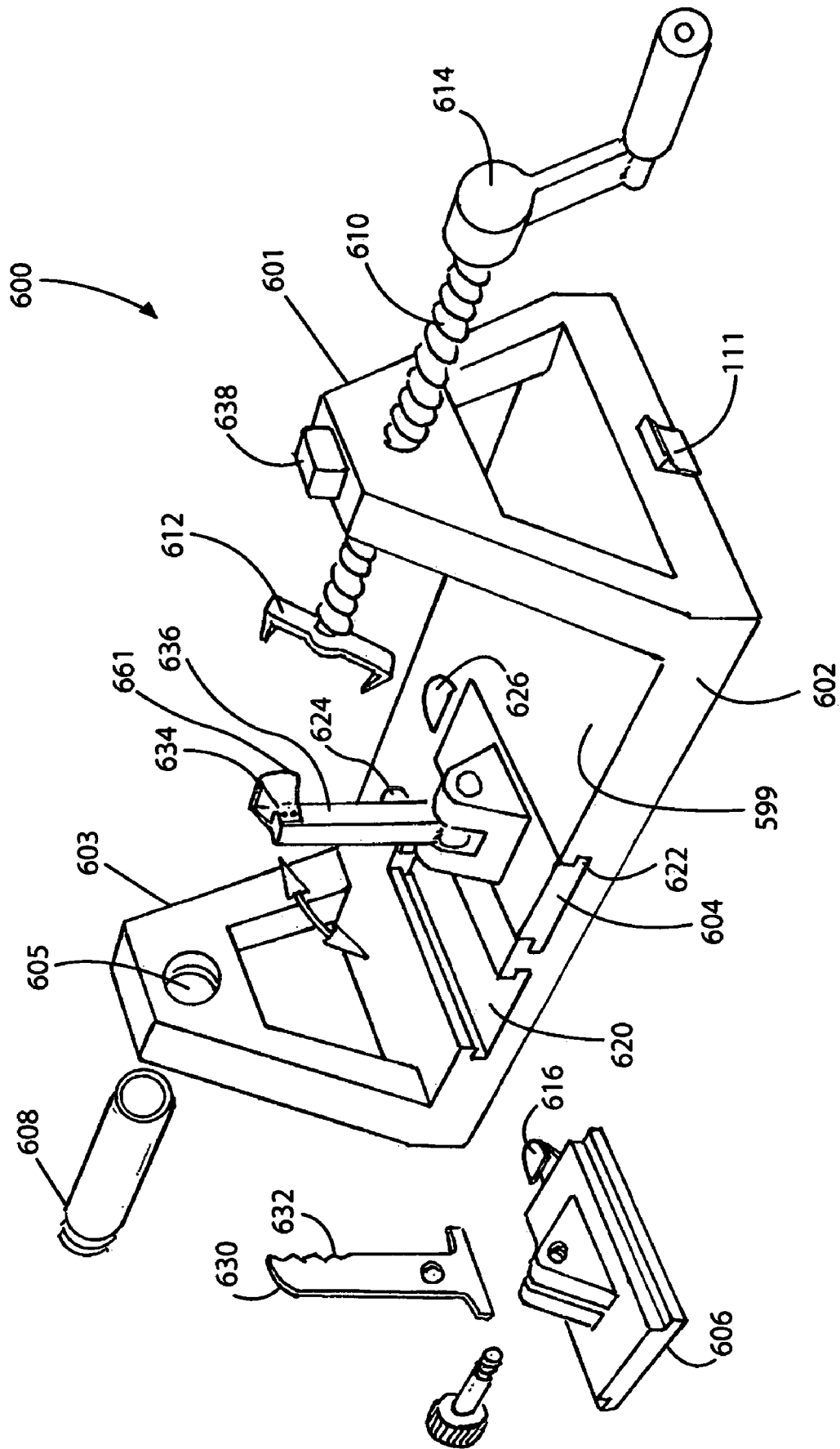
FIG. 20 is an exploded view of a peeler insert insertable within the frame of FIG. 4.

FIG. 20 illustrates a peeler insert 600 attachable to the frame 12. The peeler insert 600 peels or pares, potatoes, apples and oranges, among other food items. In addition, the peeler insert 600, in some embodiments, cores and slices the food. As for the other inserts, a peeler insert similar to the peeler insert 600 is used without the frame 12 in some embodiments of the invention.

The peeler insert 600 includes a base 602 defining a surface 599 from which two supports 601 and 603 extend substantially perpendicularly thereto. The support 601 supports a threaded axle 610 terminating in a fork 612, wider than the corer 608, at one extremity and attaching or connecting to a handle 614 at the other extremity. The threaded axle 610 is therefore threaded into or out from the support 601 by turning the handle 614. The support 603 includes a threaded recess 605 for receiving a corer 608 taking the form of a cylinder having a sharpened extremity 609 and a threaded extremity 611 for engaging the treads of the recess 605.

The base 602 receives an insert 604, and optionally an insert 606, into cavities 620 and 622 present in the base 602. The inserts 604 and 606 are shaped similarly to the blade insert 199, except that the inserts 604 and 606 do not include a blade and a tongue. Instead, the inserts 604 and 606 are slidable within the cavities 620 and 622 and reversibly lockable thereto through a latch 616 deflectable into openings 624 and 626 communicating with the cavities 620 and 622 and provided in the surface 599.

The insert 606 includes a blade 630 detachably mounted to the insert 606 substantially perpendicularly to the surface 599. The blade 630 has a cutting edge 632 oriented towards the corer 608.

The insert 604 includes a peeling blade 634 mounted on a lever 636 biased substantially perpendicularly to the surface 599 and substantially aligned with the blade 630 when no food is supported within the insert 604. The lever 636 is pivotably mounted on the insert 604. In a specific embodiment of the invention, but non-limitatively, the lever 636 pivots only slightly on the insert 604. In addition, the peeling blade 634 includes a cutting edge 661 substantially parallel to the surface 599.

A button 638 operates a device (not shown in the drawings) allowing moving the axle 610 in and out of the support 601 with no rotation. Such devices are well known in the art and are therefore not described in more details therein.

In use, the axle 610 is pulled outwardly from the peeler 600 such that the fork 612 is in close proximity to the support 601. Then, the food is impaled on the fork 612. Subsequently, the handle 614 is turned by an intended user to advance and rotate the food within the peeler 600. When the food contacts the peeling blade 634, a slice of food peripheral to the food is cut. As the handle 614 turns, the food moves along an axis of the axle 610 while turning. Therefore, the peeling blade removes an helicoidal slice of food, thereby peeling or paring the food. The biased lever 636 allows the peeling blade 634 to be positioned according to a varying radius of the food with respect to the axle 610.

When the food reaches the blade 632, an helicoidal cut extending down to a predetermined distance from the center of the food is cut. This allows the corer 608, through the sharpened extremity 609 to remove a central portion of the food, such as, for example, a core of an apple. Numerous modifications and variations of the present invention are possible in light of the above teachings. It is therefore to be understood that within the scope of the attendant claims attached hereto, this invention may be practiced otherwise than as specifically described herein.

What is claimed is:

1. A food preparation apparatus comprising:
    a main frame having a central opening for receiving a food preparation implement and having opposing ends;
    at least one slider, said slider comprising at least one pusher and a pusher base, said pusher base comprising a base and side walls forming an internal cavity, said internal cavity designed to receive said pusher, said internal cavity designed to receive the food articles for cutting, slicing and grating, said pusher comprising a plunger body with a top side and bottom side, said top side having a pushing surface for supporting a user'S hand, said bottom side of said plunger body having a plurality of protrusion for engaging the food article, said base of said pusher base comprising a top side and a bottom side, said side walls and said internal cavity is situated on said top side of said pusher base; and
    at least one interchangeable food preparation implement designed to be inserted within said central opening and locked onto said main frame during usage and being removable for cleaning and storage during non-use, said food preparation implement is selected from a group consisting of mandolins, graters, cutting devices, potato fry cutters, slicers, corers, peelers, pressing devices, food mashers, food presses and mixtures thereof.

2. The apparatus of claim 1 further comprising a moveable and adjustable handle attached to one end of said main frame, and a locking device for setting said handle at a fixed position.

3. The apparatus of claim 1 wherein said main frame has a top side and bottom side, said bottom side of said main frame comprising at least two grooves, each groove comprising a double notch profile for engaging a container with a lip and attaching said main frame onto the container when said apparatus is being used with the container.

4. The apparatus of claim 3 further comprising at least one container designed to work with said main frame during use, said container comprising an opening and a cavity formed by a base and side walls, said base having at least one protrusion for supporting said apparatus during use, said side walls having at least one ledge for supporting said apparatus during use.

5. The apparatus of claim 1 wherein said food preparation implement comprises at least one nipple and said main frame comprises a receiving cavity and at least one locking device, said nipple engaging said cavity and said locking device engages said implement to thereby allowing said implement to lock onto said main frame during use.

6. The apparatus of claim 1 wherein said pusher base further comprises at least one insertable and removeable sidewall for adjusting the size of said internal cavity of said pusher base.

7. The apparatus of claim 1 wherein said slider further comprises at least one vertical sliding arm and at least one attachment, said sliding arm being connected to said pusher base and said sliding arm being designed to engage said attachment during use with said main frame.

8. The apparatus of claim 7 wherein said attachment comprising a runner system, said system comprising at least one wheel, said runner system being designed to engage and work with said main frame of said apparatus.

9. The apparatus of claim 1 wherein said handle of said apparatus being useable with one hand and adjustable relative to said main frame with one finger.

10. The apparatus of claim 1 wherein said main frame comprises at least two arms for receiving said handle.

11. A food preparation system comprising:
    a main frame having a central opening for receiving a food preparation implement and having opposing ends;
    at least one interchangeable food preparation implement designed to be inserted within said central opening and locked onto said main frame during usage and being removable for cleaning during non-use, said food preparation implement is selected from a group consisting of mandolins, graters, cutting devices, potato fry cutters, slicers, corers, peelers, pressing devices, food mashers, food presses and mixtures thereof;
    a moveable handle attached to one end of said main frame;
    at least one container designed to work with said main frame during use; and
    at least one slider, said main frame has a top side and bottom side, said bottom side of said main frame comprising at least two grooves, each groove comprising a double notch profile for engaging a container with a lip and attaching said main frame onto the container when said apparatus is being used with the container.

12. The system of claim 11 wherein said container comprising an opening and a cavity formed by a base and side walls, said base having at least one protrusion for supporting said apparatus during use, said side walls having at least one ledge for supporting said apparatus during use.

13. The system of claim 11 wherein said food preparation implement comprises at least nipple and said main frame comprises a receiving cavity and at least one locking device, said nipple engaging said cavity and said locking device engages said implement to thereby allowing said implement to lock onto said main frame during use.

14. The system of claim 11 wherein said system further comprising at least one slider, said slider comprising at least one pusher: a pusher base: at least one vertical sliding arm: and at least one attachment, said pusher base comprising a base and side walls forming an internal cavity, said internal cavity designed to receive said pusher, said internal cavity designed to receive the food articles for cutting, slicing and grating.

15. The system of claim 14 wherein said pusher comprising a plunger body with a top side and bottom side, said top side having a pushing surface for supporting a user'S hand, said bottom side of said plunger body having a plurality of protrusion for engaging the food article, said base of said pusher base comprising a top side and a bottom side, said side walls and said internal cavity is situated on said top side of said pusher base.

16. The system of claim 14 wherein said sliding arm being connected to said pusher base and said sliding arm being designed to engage said attachment during use with said main frame.

17. The system of claim 16 wherein said attachment comprising a runner system, said system comprising at least one wheel, said runner system being designed to engage and work with said main frame of said apparatus.

18. A food preparation apparatus comprising:
    a main frame having a central opening for receiving a food preparation implement and having opposing ends, said main frame has a top side and bottom side, said bottom side of said main frame comprising at least two grooves, each groove comprising a double notch profile for engaging a container with a lip and attaching said main frame onto the container when said apparatus is being used with the container; and
    at least one interchangeable food preparation implement designed to be inserted within said central opening and locked onto said main frame during usage and being removable for cleaning and storage during non-use, said food preparation implement is selected from a group consisting of mandolins, graters, cutting devices, potato fry cutters, slicers, corers, peelers, pressing devices, food mashers, food presses and mixtures thereof.

* * * * *